US008234022B2

(12) United States Patent  
Morichika et al.

(10) Patent No.: US 8,234,022 B2  
(45) Date of Patent: Jul. 31, 2012

(54) TRACK TRANSPORTATION SYSTEM

(75) Inventors: Shunji Morichika, Hiroshima (JP);
Katsuaki Morita, Hiroshima (JP);
Hiroyuki Kono, Hiroshima (JP);
Hiroyuki Mochidome, Hiroshima (JP);
Hiroshi Yamashita, Hiroshima (JP);
Masahiro Yamaguchi, Hiroshima (JP);
Kosuke Katahira, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 498 days.

(21) Appl. No.: 12/373,800

(22) PCT Filed: Nov. 1, 2006

(86) PCT No.: PCT/JP2006/322403
§ 371 (c)(1), (2), (4) Date: Feb. 18, 2009

(87) PCT Pub. No.: WO2008/053572
PCT Pub. Date: May 8, 2008

(65) Prior Publication Data
US 2009/0259352 A1 Oct. 15, 2009

(51) Int. Cl.
G05D 1/00 (2006.01)
(52) U.S. Cl. ........................................ 701/19
(58) Field of Classification Search .......... 104/242–247, 104/304, 88.01, 88.02; 105/3, 4.4, 72.2; 180/167–169, 446; 701/19, 20
See application file for complete search history.

(56) References Cited

U.S. PATENT DOCUMENTS

| 3,822,648 A | | 7/1974 | Ishii et al. | |
| 3,902,431 A | * | 9/1975 | McCain | 104/246 |
| 4,089,272 A | * | 5/1978 | Schmitz | 104/247 |
| 4,183,304 A | | 1/1980 | Forster | |

(Continued)

FOREIGN PATENT DOCUMENTS

EP 0990576 A2 4/2000

(Continued)

OTHER PUBLICATIONS

Written Opinion of the International Searching Authority for PCT/JP2006/322403 mailed Jun. 4, 2009.

(Continued)

Primary Examiner — S. Joseph Morano
Assistant Examiner — R. J. McCarry, Jr.
(74) Attorney, Agent, or Firm — Kanesaka, Berner & Partners LLP

(57) ABSTRACT

The essential feature of the present invention is the provision of a track transportation system in which a vehicle runs on a predetermined track, being automatically steered, having a simplified and lightweight structure so as to surely ensure a safety, and to be capable of carrying out efficient and high-speed operation. The track transportation system according to the present invention incorporates a steering mechanism for automatic steering by means of an M actuator, a protection guide rail laid on the track, protection guide wheels which travel together with the vehicle along the protection guide rail without making contact with the latter, and a control means for controlling automatic steering in accordance with a result of determination by a track data determining means for determining a straight portion, a curved portion, a turnout portion or the like of the track in view of vehicle position data, and steering caused by the protection wheels making contact with the protection guide rail.

7 Claims, 18 Drawing Sheets

U.S. PATENT DOCUMENTS

| | | | |
|---|---|---|---|
| 4,223,611 A | 9/1980 | Dawson et al. | |
| 6,237,504 B1 * | 5/2001 | Tanahashi et al. | 104/243 |
| 6,364,215 B1 | 4/2002 | Andre et al. | |
| 6,477,963 B1 * | 11/2002 | Weule et al. | 104/243 |
| 6,520,303 B1 | 2/2003 | Malek et al. | |
| 7,757,608 B2 * | 7/2010 | Kono et al. | 104/88.01 |
| 2006/0200280 A1 | 9/2006 | Kono et al. | |

FOREIGN PATENT DOCUMENTS

| | | |
|---|---|---|
| EP | 1564614 A1 | 8/2005 |
| EP | 1652746 A1 | 5/2006 |
| JP | 49-42610 | 4/1974 |
| JP | 50-33576 | 10/1975 |
| JP | 61143817 A | 7/1986 |
| JP | 61-127073 | 8/1986 |
| JP | 4257006 A | 9/1992 |
| JP | 4372466 A | 12/1992 |
| JP | 5119642 A | 5/1993 |
| JP | 10069219 A | 3/1998 |
| JP | 2000-172336 A | 6/2000 |
| JP | 2000264196 A | 9/2000 |
| JP | 2002312034 A | 10/2002 |
| JP | 2002351544 A | 12/2002 |
| JP | 2003104198 A | 4/2003 |
| JP | 2003146204 A | 5/2003 |
| JP | 2005161939 A | 6/2005 |
| JP | 2006111037 A | 4/2006 |
| JP | 2006175962 | 7/2006 |
| JP | 2006175962 A | 7/2006 |
| JP | 2006205944 A1 | 8/2006 |
| JP | 2006205945 A1 | 8/2006 |
| JP | 2006205946 A | 8/2006 |
| JP | 2006306334 A | 11/2006 |
| WO | 00/53480 A1 | 9/2000 |
| WO | 2005007480 A1 | 1/2005 |

OTHER PUBLICATIONS

Australian Search Report for SG200901115-6 mailed Jul. 2, 2009.
Singapore Search and Examination Report for Application No. 200901115-6 mailed May 17, 2010.
Korean Office Action for Application No. 2009-7001834 issued Jan. 7, 2011.
ISR for PCT/JP2006/322403 dated Feb. 27, 2007.
ISR for PCT/JP2003/013953 dated Feb. 17, 2004.
EP Search Report for 06 82 3277 dated Feb. 16, 2012.

* cited by examiner

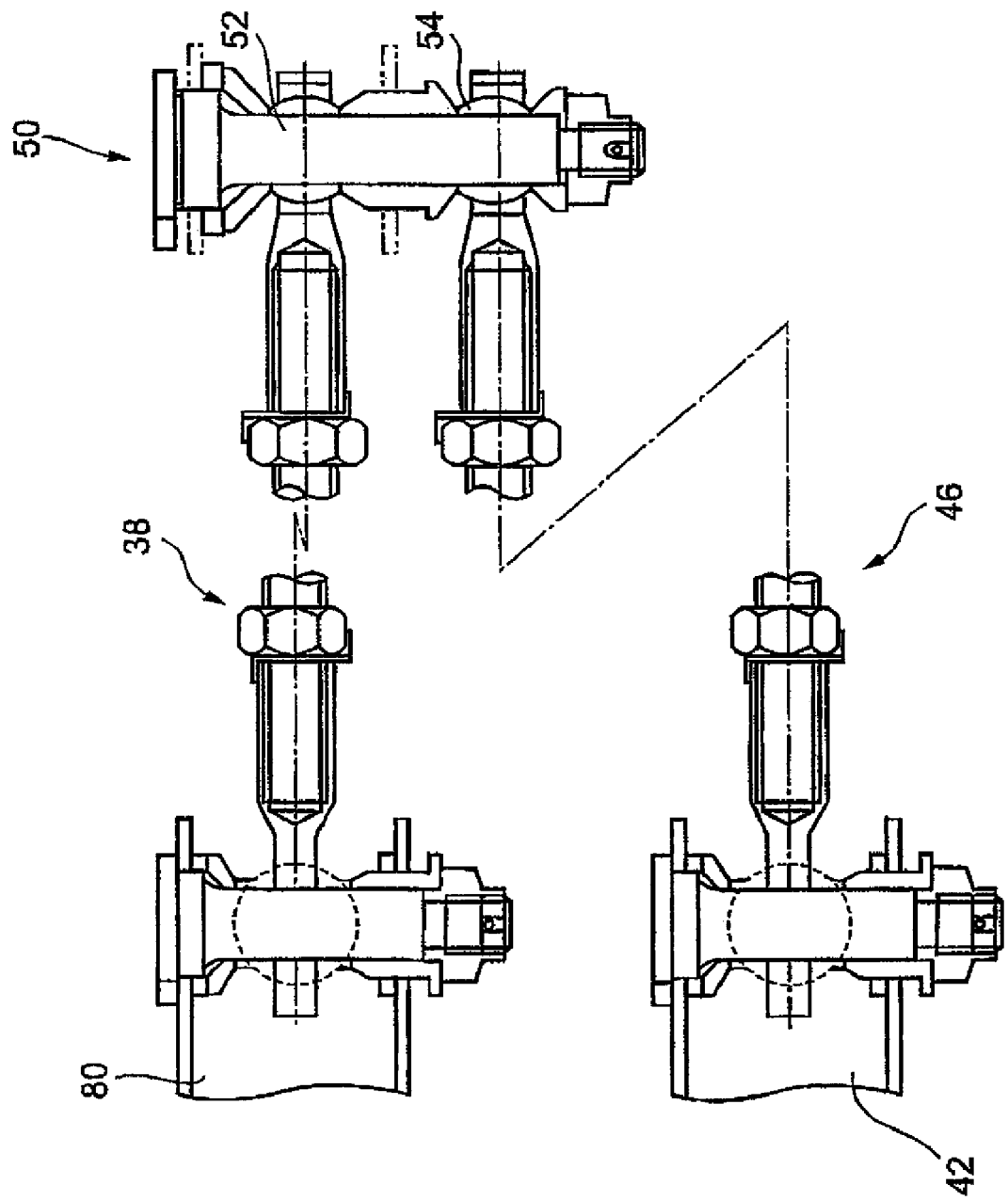

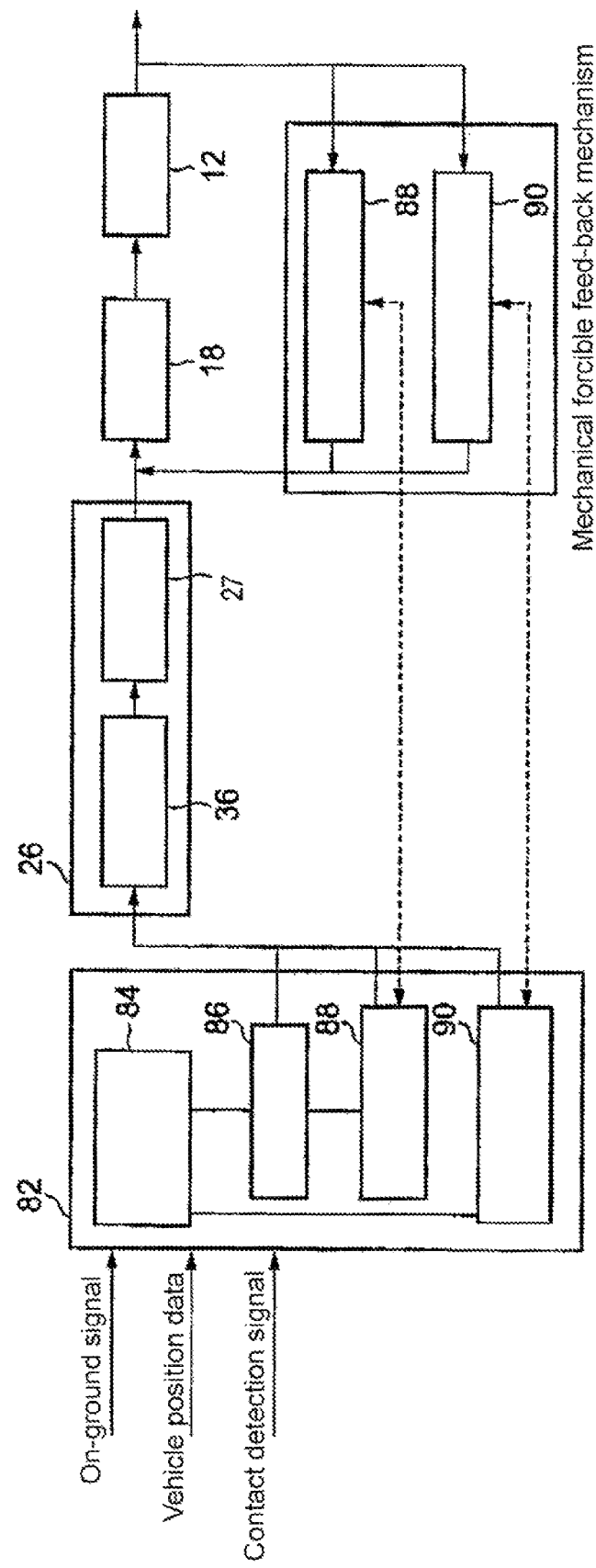

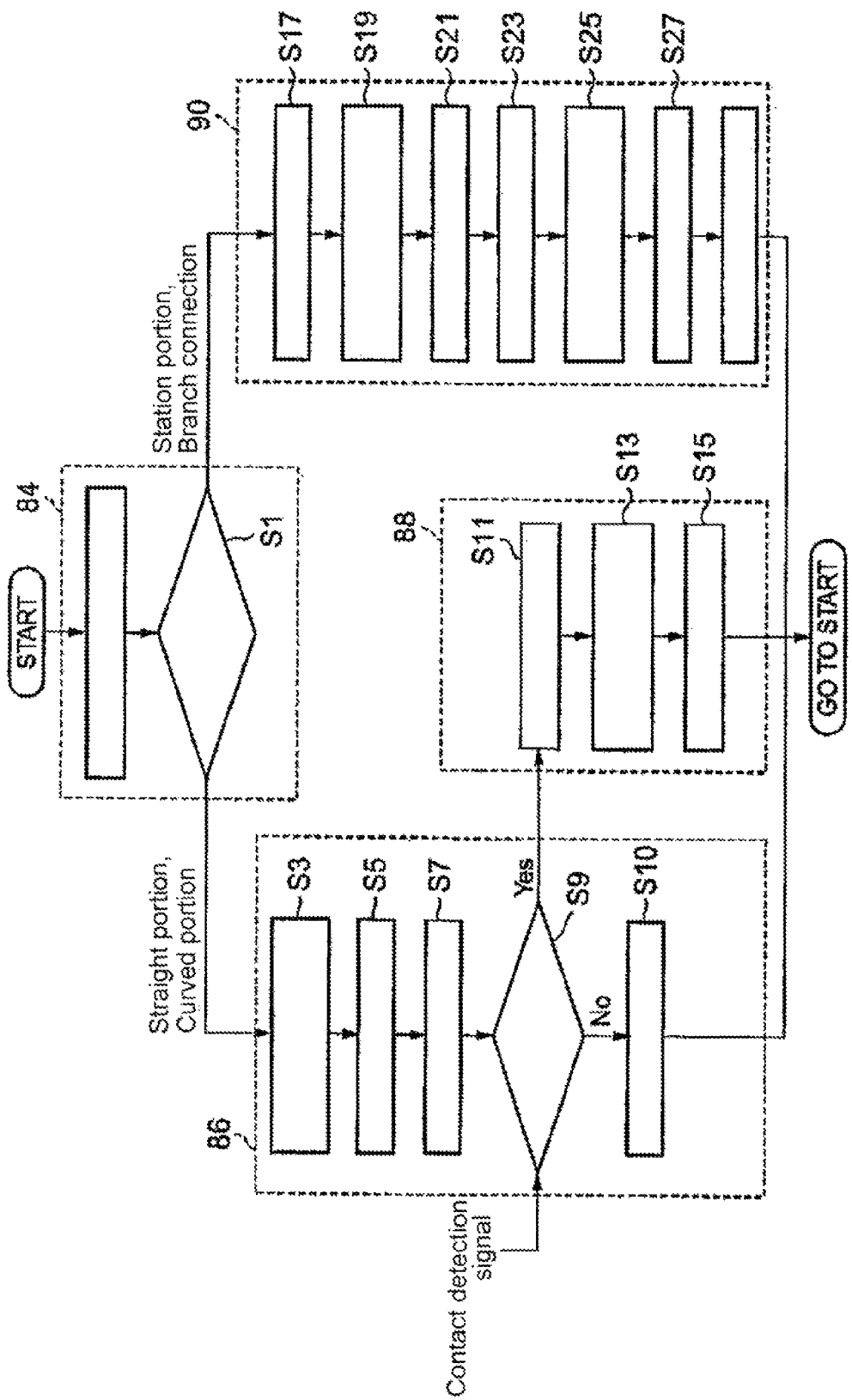

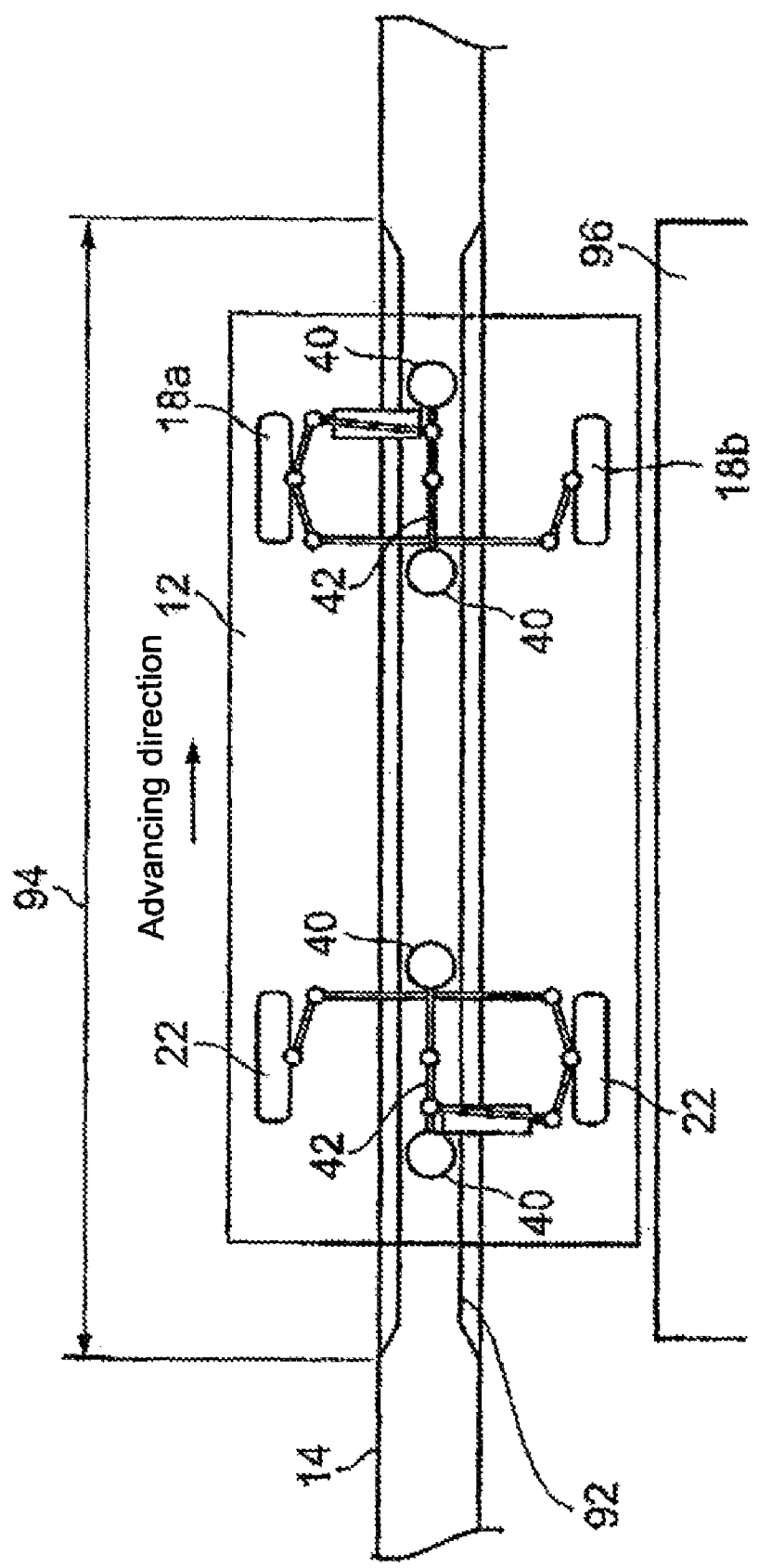

Advancing direction

TRACK TRANSPORTATION SYSTEM

RELATED APPLICATIONS

The present application is based on, and claims priority from, International Application Number PCT/JP2006/322403, filed Nov. 1, 2006, the disclosure of which is hereby incorporated by reference herein in its entirety.

TECHNICAL FIELD

The present invention relates to a transportation system for a vehicle which runs on a predetermined track by means of, for example, running wheels of a rubber tire type.

BACKGROUND ART

A vehicle in new transportation system, having rubber tires which carries a vehicle body and which are adapted to be driven for rotation so as to run the vehicle, is different from a railway vehicle running on rails, and is normally provided with steering guide wheels for steering the rubber tires serving as running wheels along a predetermined track. Accordingly, the guide wheels make contact with a guide rail provided along the track in order to mechanically steer the vehicle.

For example, Patent Document 1 (Japanese Patent Laid-Open No. 2003-146204) discloses a bogie for a guide rail vehicle, having guide wheels which are provided to the distal ends of arms projected from a vehicle body and which are mounted on eccentric shafts so as to enable easy adjustment for a degree of projection from the vehicle body in order to steer the vehicle body.

Further, Patent Document 2 (Japanese Patent Laid-Open No. 2003-104198) discloses the configuration that a gap is obtained between a guide wheel which is on the rear side as viewed in the running direction of a vehicle, and a guide surface of a track, and the vehicle can be turned within this gap.

There has been known other Patent Documents, U.S. Pat. No. 6,520,303 (Patent Document 3), U.S. Pat. No. 6,364,215 (Patent Document 4), and WO00/53480(Patent Document 5) which disclose the prior art that a vehicle runs being mechanically steered by such a way that guide wheels make contact with a guide rail which is laid along a track.

However, the above-mentioned mechanical guide mechanisms which are though excellent in safety and reliability, cause the configuration of a bogie of a vehicle, on which wheels and drive mechanism are mounted, to be complicated, and as a result, the mass and the running costs of the vehicle are increased, and further, a guide rail having a strength which is sufficient for supporting the guide wheels, should be laid with a high degree of accuracy over the entire length of a track, resulting in the disadvantages that the construction costs of the track becomes extremely high.

Thus, in order to overcome the above-mentioned disadvantages, there has been proposed a vehicle steering system which does not require, in particular, any guide rail or the like for steering a vehicle (Patent Document 3).

The steering system disclosed In Japanese Patent Laid-Open No. 2002-35144 (Patent Document 6) has several ground elements which store therein data required for driving a vehicle and transmit the same are laid along a track on which the vehicle runs, a control unit mounted on the vehicle consecutively delivers steering instructions on the basis of the data transmitted from the ground elements during running of the vehicle, and accordingly, a steering unit mounted on the vehicle steers the vehicle in response to the steering instructions, thereby it is possible to eliminate the necessity of a guide rail for steering a vehicle so as to be aim at reducing the construction costs and the maintenance costs. Thus, there can be offered the advantage that vibration and noises caused by guide wheels making contact with a guide rail can be reduced.

Explanation will be made of the steering system disclosed in Patent Document 3 with reference to FIGS. 24A, 24B and 25. FIG. 24 is views illustrating the configuration of the steering system, that is, FIG. 24A is a side view and FIG. 24B is a front view, and FIG. 25 is a plan view illustrating a steering unit. Referring to these figures, a vehicle 03 in a new transportation system runs on a track 01. The vehicle 03 is supported by rubber tires 05 carried by bogies 04 which are provided respectively to the front and rear parts of the vehicle 03 through the intermediary of air springs, and runs being driven by rotating motors 06 while the vehicle 03 is steered by an actuator 07.

The steering system comprises ground elements 02, a transmitter 08, a receiver 09, a control unit 010 and a steering unit 020, and turns the rubber tires 05 in order steer the vehicle 03. The ground elements 02 are those which have no electric source, which are laid at predetermined intervals along the overall length of the track 01, and on each of which inherent information is set. Such inherent information includes an identification number of the ground element, position data, track data and control data.

The positional data (on-ground position) relates to the position of a ground element 02, that is, for example, absolute position coordinates or a distance from a reference point. Further, there are set on the ground element 02, as necessary, track data such as a gradient, a curvature, a cant, a turnout portion and the like which exhibit a condition of the track 01 at the point of the ground element 02, as the above-mentioned inherent data.

Such a ground element 02 is electric-powerless, but is adapted to deliver a signal indicating the thus set driving data when an electric power is fed thereto. The ground element 02 is composed of, for example, an electronic circuit including a ROM in which the driving data is stored.

The transmitter 08 is adapted to feed an electric power to the ground element 02 through radio wave propagation, and the receiver 09 receives drive data transmitted from the ground element 02 to which the electric power have been fed. The control unit 010 carries out a predetermined data-processing on the basis of the drive data received by the receiver 09, and delivers a speed instruction and a steering instruction to a drive motor 06 and an actuator 07.

The steering unit 020 which includes the actuator 07 to be operated in response to the steering instruction, is adapted to turn the rubber tires 05, and is composed of an arm 011 pivotally attached at one end to the bogie 04 through the intermediary of a pin the actuator 07 which is attached to the distal end of the arm 011 and which may be electric, hydraulic or pneumatic, a link rod 059, levers 056a, 056b for the left and right rubber tires 05 and a tie rod 057 coupling these levers therebetween.

With the above-mentioned units, when the actuator 07 is operated by the steering instruction from the control unit 010, the arm 011 is rotated around the pin 012 as a center in response to the instruction, and accordingly, the motion of the arm actuates the levers 056a, 056b through the intermediary of the link rod 059 and the tie rod 05 in order to turn the rubber tires 05 leftward or rightward.

This steering system steers the vehicle 03 on the basis of drive data stored in the ground element 02 with no use of any guide rail, and accordingly, it is possible to eliminate the necessity of the guide rail and the like, thereby it is possible to greatly reduce the construction costs of the track 01. Further, since no guide wheels are used, consumables thereof are not required, resulting in reduction of the maintenance costs, and further, since no contact between the guide wheels and the guide rail is caused, there may be offered the advantage that vibration and noise can be reduced.

However, the steering system disclosed in the Patent Document 3 does not use a mechanical steering mechanism including guide wheels and a guide rail, and accordingly, requires safety measures for protection against runaway or come-off of the vehicle from the track in the case of a failure of the steering system or emergency caused by environment disturbance, that is, strong wind, rain, snow or the like. Moreover, since deviation of the running position of the vehicle which runs on the track gradually increases, being caused by a variation in the frictional coefficient of the road surface of the track due to a variation in the environmental disturbance, a number of passengers, abrasion of the tires or the like, it is required to compensate this deviation in order to carry out a safe and high speed operation with a high degree of efficiency.

Thus, it is extremely important to ensure the safety, and to compensate a deviation of a running position, and so forth for the transportation system having a track on which a vehicle runs, being automatically steered along a predetermined running course without using any mechanical steering mechanism including guide wheels and guide rails. The above-mentioned conventional track transportation system has been insufficient for ensuring the safety compensating a deviation of a runninc position with a simple and lightweight configuration, and also capable of diving at a high speed with a high degree of accuracy.

[Patent Document 1] Japanese Patent Laid-Open No. 2003-146204
[Patent Document 2] Japanese Patent Laid-Open No. 2003-104198
[Patent Document 3] U.S. Pat. No. 6,520,303
[Patent Document 4] U.S. Pat. No. 6,364,215
[Patent Document 5] WO00/53480
[Patent Document 6] Japanese Patent Laid-Open No. 2002

SUMMARY

The present invention is contrived in consideration of the above-described problems, and an object of the invention is to provide a track transportation system in which a vehicle runs on a predetermined truck, being automatically steered, having a simplified and lightweight structure so as to surely ensure a safety, and to be capable of carrying out efficient and high-speed operation without using a mechanical steering mechanism such as guide wheels and a guide rail.

In order to obtain the above-described object, according to an aspect of the invention, there is provided a track transportation system in which a vehicle runs on a predetermined track, comprising: a steering mechanism for automatically steering front and rear wheels of the vehicle by means of actuators, a protection guide rail laid on a road surface of the track, protection guide wheels traveling along the protection guide rail without making contact with the latter, and provided at least in one set in each of front and rear parts of the vehicle underneath the vehicle, a link mechanism linked to the steering mechanism so as to turn the protection guide wheels into one and the same direction as the steering direction of the front or rear wheels during running oE the vehicle, and a control means comprising a track data determining means for determining a straight portion, a curved portion, a turnout portion or the like of the track in view of a vehicle position data, for controlling an automatic steering instruction delivered to the steering mechanism in response to the track data determined by the track data determining means.

With the aspect of the invention, the track data determining means determines the straight portion, the curved portion, the stop station, the turnout portion or the like for controlling the automatic steering instruction delivered to the steering mechanism in response to the track data so that a section of the track that requires the automatic steering is properly controlled, thereby it is possible to enhance the safety and the reliability of the transportation system during running of the vehicle under automatic steering, and to enable the vehicle to run with a high degree of efficiency and at a high speed.

According to a further aspect of the invention, there is provided a track transportation system, in which the automatic steering is controlled in accordance with a predetermined steering pattern if the track data determining means determines a norma straight or curved portion.

With the aspect of invention, especially for the straight portion or the curved portion of the track without the station portion, the turnout portion or the like thereby the position of the running vehicle does not change much, it is possible to carry out the driving of the automatic steering smoothly in response to the predetermined steering pattern stored in the control means.

According to a further aspect of the invention, there is provided a track transportation system, in which the control means includes a fail-safe means for interrupting the control for the automatic steering when the steering mechanism is abnormal during the control for the automatic steering, and steering the vehicle with the use of the protection guide wheels in such a way that the protection guide wheels make contact with the protection guide rail.

With the aspect of the invention, when the steering mechanism is abnormal during the control for the automatic steering, the control for the automatic steering is stopped by the fail-safe means, and vehicle is steered by the use of the protection guide wheels in such a way that the protection guide wheels make contact with the protection guide rail. Thus, due to the provision of the fail-safe means, even though a failure or the like of the steering mechanism in the vehicle occurs, the vehicle can be safely protected, and passengers can be surely transported, thereby it is possible ensure the safety and the reliability. Moreover, because the fail-safe means is achieved with such an extremely simple feature, not only having a simplified and lightweight structure of the vehicle but also reduction of infrastructure cost and also simplifying the structure of ground equipments such as track facility can be achieved.

According to a further aspect of the invention, there is provided a track transportation system 1, comprising a vehicle position correcting means for interrupting the steering by the steering mechanism if the track data determining means determines a station portion, a turnout portion, a point just therebefore or the like, and for forcing the protection guide wheels to be positioned on a travel path defined by the protection guide rail so as to correct the position of the vehicle.

With the aspect of the invention, when the track data determines the station portion, the turnout portion, the point just therebefore or the like, the steering by the steering mechanism is stopped by the vehicle position correcting means, and the vehicle position correcting means forces the protection guide wheels to be positioned on a travel path defined by the protection guide rail so as to correct the position of the vehicle. Therefore, the position of the vehicle can be corrected to be on an original position on the track or a desired set position. For example, adjustment in order to obtain an appropriate space with respect to a platform in the stop station, or adjustment the position for carrying out a smooth movement at the turnout portion is possible.

According to a further aspect of the invention, there is provided a track transportation system, characterized by further comprising a protection arm extended longitudinally of the vehicle and pivotally supported at its center to the lower part of an axle of the front or rear wheel, and is provided at its both front and rear end parts with the protection wheels, the steering mechanism includes a tie rod coupling the left and right wheels, and the actuator for applying a steering force to one of the left and right wheels, and the link mechanism includes a link rod for linking the protection arm to one of the left and right wheels.

With the aspect of the invention, as the steering mechanism includes the tie rod coupling the left and right wheels, and the actuator for applying the steering force to one of the left and right wheels, thereby the steering force applied to one of the wheels by the actuator impinges to another wheel as well reliably, and thereby it is possible to construct so-called an Ackermann link mechanism for the vehicle to turn smoothly. Moreover, since the link mechanism comprises a link rod for linking the protection arm to one of the left and right wheels, it is possible to simplify and trim weight of the link mechanism.

According to a further aspect of the invention, there is provided a track transportation system, characterized in that a protection arm is extended longitudinally of the vehicle and pivotally supported at its center to the lower part of an axle of the front or rear wheels, and is provided at its both front and rear end parts with the protection guide wheels, the steering mechanism includes left and right tie rods linking the protection arm respectively to the left and right wheels, and the actuator for turning the protection arm.

With the aspect of the invention, since the steering mechanism includes left and right tie rods linking the protection arm respectively to the left and right wheels, and the actuator for turning the protection arm, a tie rod for linking the left and right wheels is unnecessary. Further, as the left and right tie rods combine the function of the link mechanism, it is possible to further simplify and trim weight the steering mechanism and the link mechanism. Furthermore, since the protection arm is directly operated by the actuator, it is possible to reduce control delay or control error resulting in accurate control According to a further aspect of the invention, there is provided a track transportation system, wherein the actuator is incorporated in a rotary support bearing portion of the protection arm.

With the aspect of the invention, since the actuator is incorporated in a rotary support bearing portion of the protection arm, it is possible to construct the equipment itself compact and can improve the steering accuracy.

According to a further aspect of the invention, there is provided a track transportation system, characterized in that the rotating center of the protection arm is located at a middle of a center axial line of the left and right wheels, and a vertical distance H from the center axial line to the coupling point of the left and right side tie rods with respect to the protection arm is set to be greater that a vertical distance H' from the center axial line to the coupling points of the tie rods with respect to the wheel side (H>H').

With the aspect of the invention, the rotating center of the protection arm is located at tie middle of the center axial line of the left and right wheels, and the vertical distance H from the center axial line to the coupling point of the left and right side tie rods with respect to the protection arm is set be greater that a vertical distance H' from the center axial line to the coupling points of the tie rods with respect to the wheel side (H>H'), thereby so-called Ackermann style steering mechanism is formed, and the steering angles for the left and right wheels are appropriately set, and turning function is ensured.

According to a further aspect of the invention, there is provided a track transportation system, characterized in that the protection guide rail is formed of a U-like steel bar, the protection guide wheels are arranged in the U-like steel bars without making contact with side walls of the protection guide rail, and the protection wheels are arranged respectively at both front and rear ends parts of the protection arm, two for each end part, on the left and right sides of the protection arm, as viewed in a plane view.

With the aspect of the invention, the protection guide wheels are arranged in the U-like steel bars without making contact with both of the side walls of the protection guide rail, and the protection wheels are arranged respectively at both front and rear ends parts of the protection arm, two for each end part, on the left and right sides of the protection arm. Therefore, the side on which the protection guide wheels are made into contact the side walls is fixed, the protection guide wheels are rotated in one and the same direction if the advancing direction is fixed, thereby it is possible to enhance the durability of the protection guide wheels.

According to a further aspect of the invention, there is provided a track transportation system, characterized in that the protection guide rail is formed of a U-like steel bar, the protection guide wheels are arranged in the U-like steel bars without making contact with side walls of the protection guide rail, and the protection wheels are arranged respectively at both front and rear ends parts of the protection arm, two for each end part, on both left and right sides of the protection arm, being longitudinally shifted from each other.

With the aspect of the invention, since the protection guide wheels are arranged in the U-like steel bars without making contact with both of the side walls of the protection guide rail, and the protection wheels are arranged respectively at both front and rear ends parts of the protection arm, two for each end part, on the left and right sides of the protection arm, when the protection guide rail has one and the same width, the diameter of the protection guide wheels can be increased, thereby it is possible to further enhance the durability of the protection guide wheels.

According to a further aspect of the invention, there is provided a track transportation system, characterized in that the protection guide rail is formed on an I-like steel bar, and the left and right protection wheels and the protection arms are arranged so as to interpose the I-like steel bar therebetween, the left and fight protection arms are linked to each other by a protection arm link rod so as to cause the left and right arms to be operating in parallel with each other.

With the aspect of invention, since the protection guide rail applies the form of I-like steel bar, the structure of the protection guide rail can be simplified. Further, bending the protection guide rail so as to form a curved portion can be facilitated, and accordingly, the protection guide rail can be readily laid. Further, the place where the protection guide rail is laid, can be shifted from the center of the track.

According to a further aspect of the invention, there is provided a track transportation system, characterized in that the protection guide rail is formed of an I-like steel bar, the protection guide wheels are arranged back and forth so as to interpose the I-like steel bar therebetween, being shifted back and forth, the front and rear protection guide wheels are linked to each other through the intermediary of protection wheel link rods, and the protection guide wheel link rods which are arranged back and forth are linked to each other by means of the protection arm.

With the aspect of invention, since only one protection arm 42 is used, the structure of the protection arm 42 can be simplified, and accordingly, the weight thereof can be reduced.

According to the present invention, there can be provided a track transportation system in which a vehicle runs on a predetermined truck, being automatically steered, having a simplified and lightweight structure so as to surely ensure a safety, and to be capable of carrying out efficient and high-speed operation without using a mechanical steering mechanism such as guide wheels and a guide rail.

BRIEF DESCRIPTION OF THE DRAWINGS

FIG. 5 is an enlarged view illustrating a part B in FIG. 2A,

FIG. 6 is a block diagram illustrating a control system in the first embodiment of the present invention, FIG. 7 is a flowchart for explaining a control procedure in the first embodiment of the present invention, FIG. 8 is a flowchart for explaining a control procedure carried out by a vehicle position correcting means, FIG. 15 is views for explaining the motion of a steering mechanism in the third and fourth embodiments of the present invention, in which

DETAILED DESCRIPTION

Figure 1:
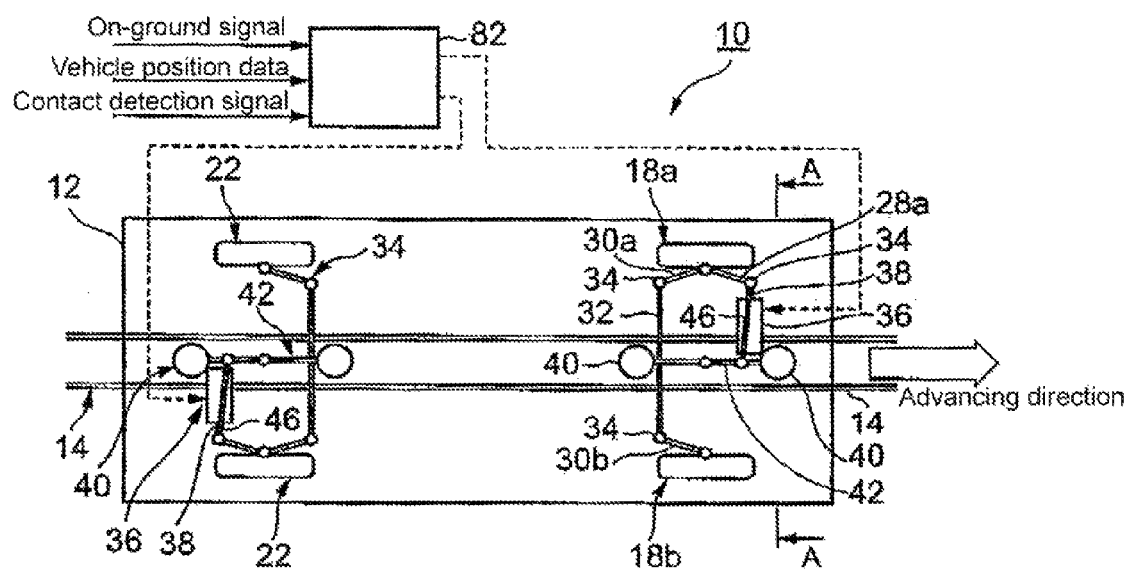
FIG. 1 is an explanatory plan view illustrating a tack transportation system in a first embodiment of the present invention.

Detailed explanation will be herein below made of preferred embodiments of the present invention in the exemplified forms with reference to the accompanying drawings. It is noted here that dimensions, materials, shapes and relative arrangements and the like of components described in these embodiments are mere examples for explaining the present invention, and should not be intended to limit the technical scope of the present invention unless otherwise specified. Further, like reference numerals are used to denote like parts throughout the accompanying drawings in order to abbreviate duplicate explanation thereto.

Figure 2A:
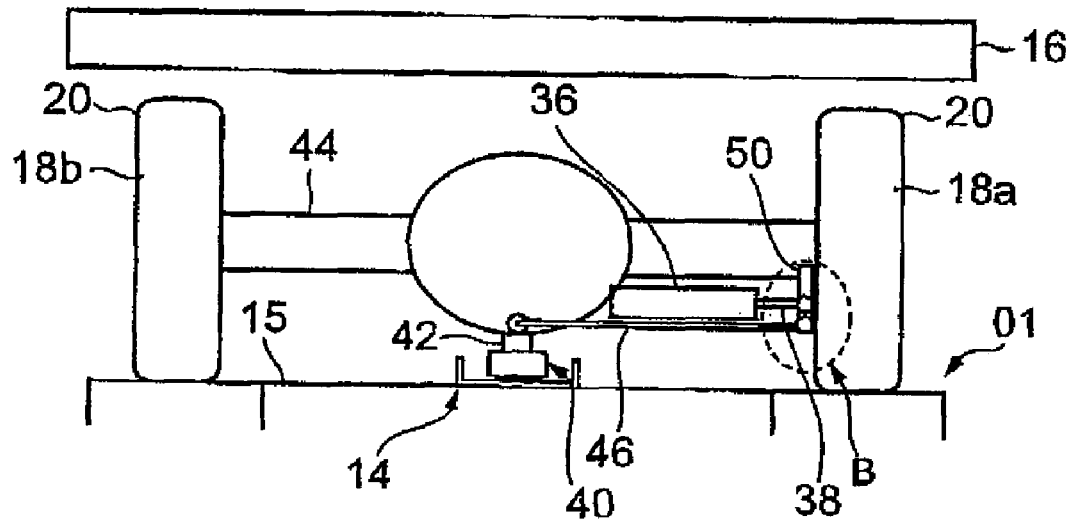
FIG. 2A is a sectional view along line A-A in FIG. 1.
Figure 2B:
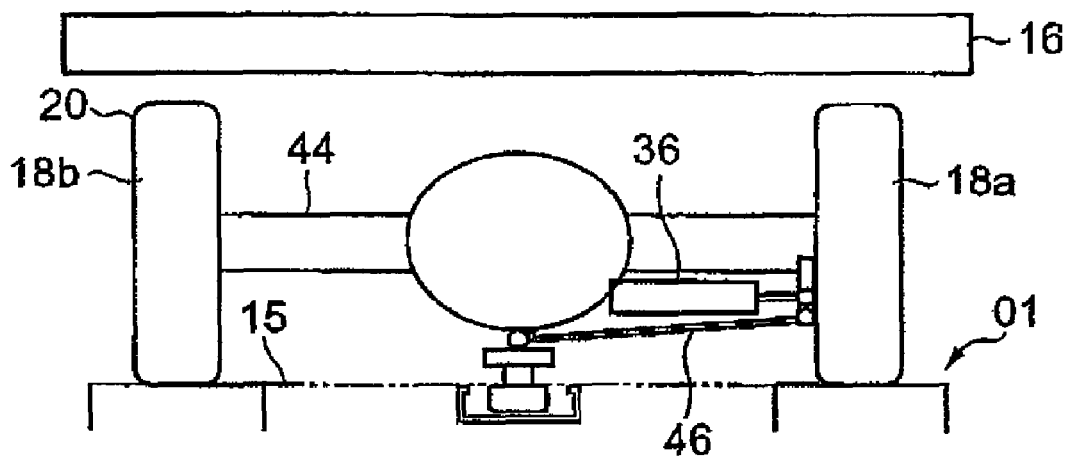
FIG. 2B is an explanatory view illustrating a variant form of the track transportation system shown in FIG. 2A.
Figure 3A:
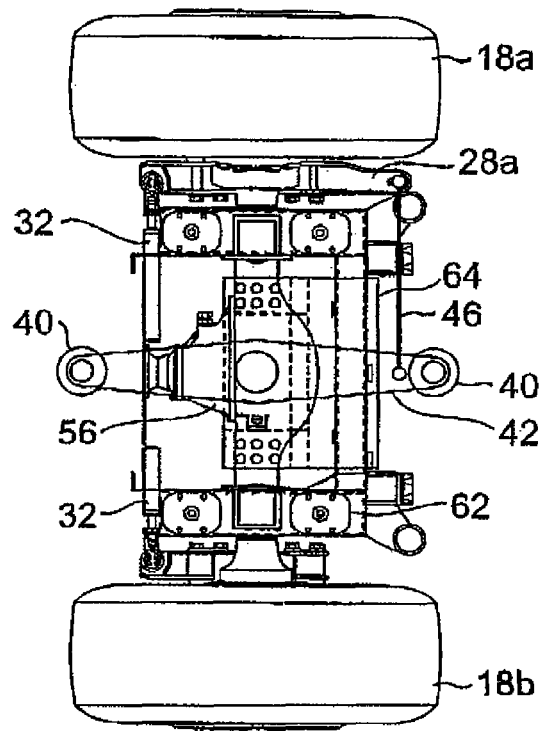
FIG. 3A is a plan view illustrating a configuration of a vehicle attached thereto with protection guide wheels.
Figure 3B:
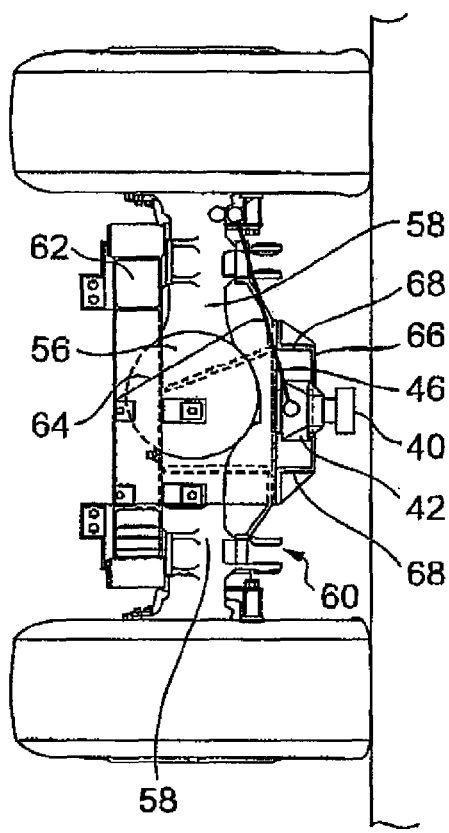
FIG. 3B is a front view illustrating the configuration shown in FIG. 3A.
Figure 3C:
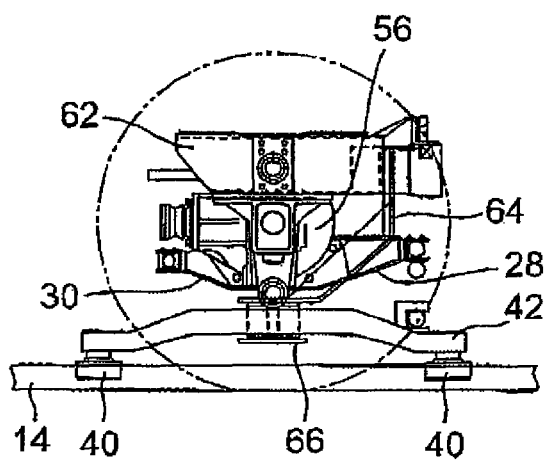
FIG. 3C is a side view illustrating the configuration.
Figure 4A:
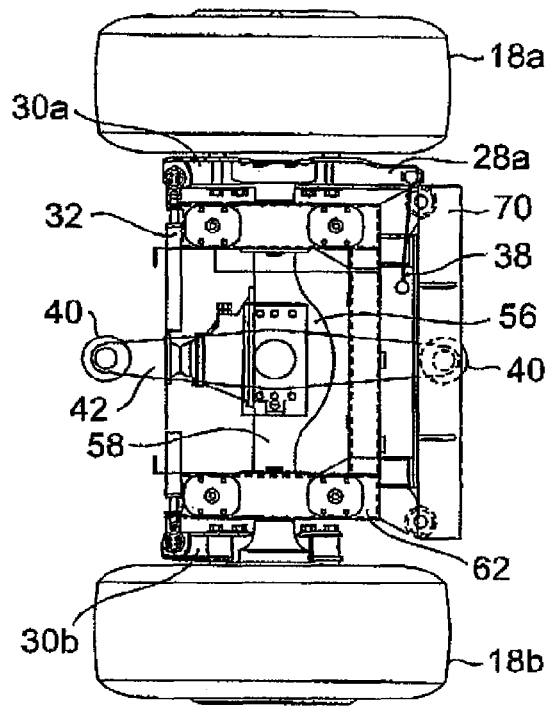
FIG. 4A is a plan view illustrating the configuration attached thereto with an actuator.
Figure 4B:
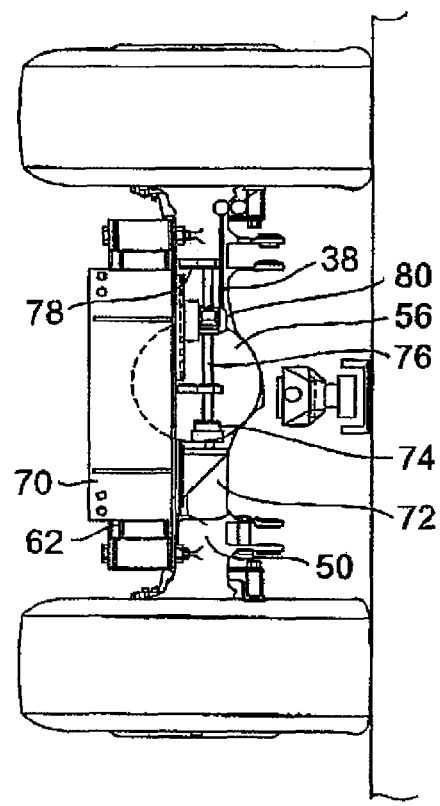
FIG. 4B is a front view illustrating the configuration shown in FIG. 4A.
Figure 9:
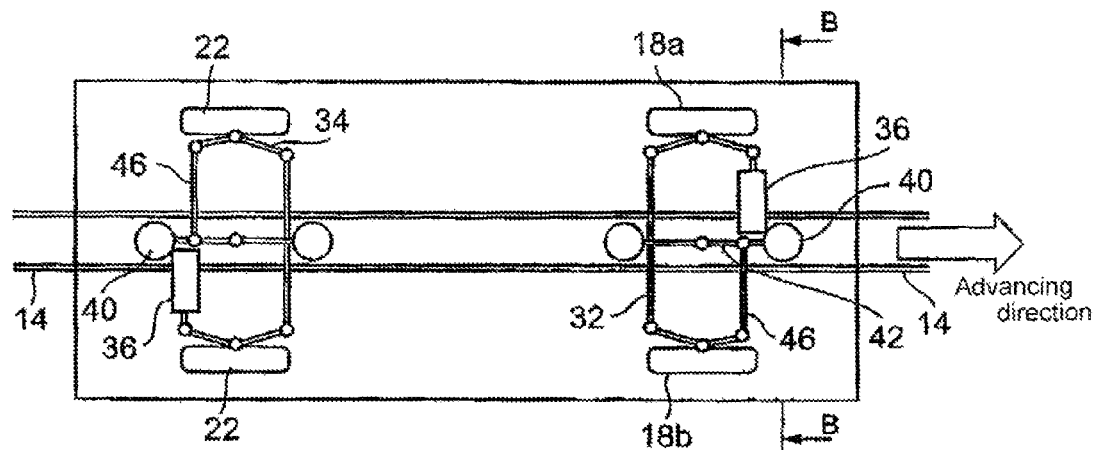
FIG. 9 is an explanatory plan view illustrating a track transportation system in a second embodiment of the present invention.
Figure 10:
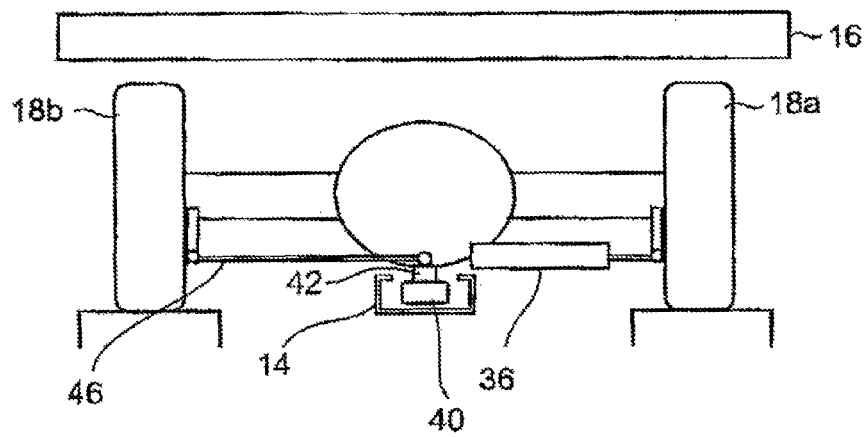
FIG. 10 is a sectional view along line B-B in FIG. 9.
Figure 11:
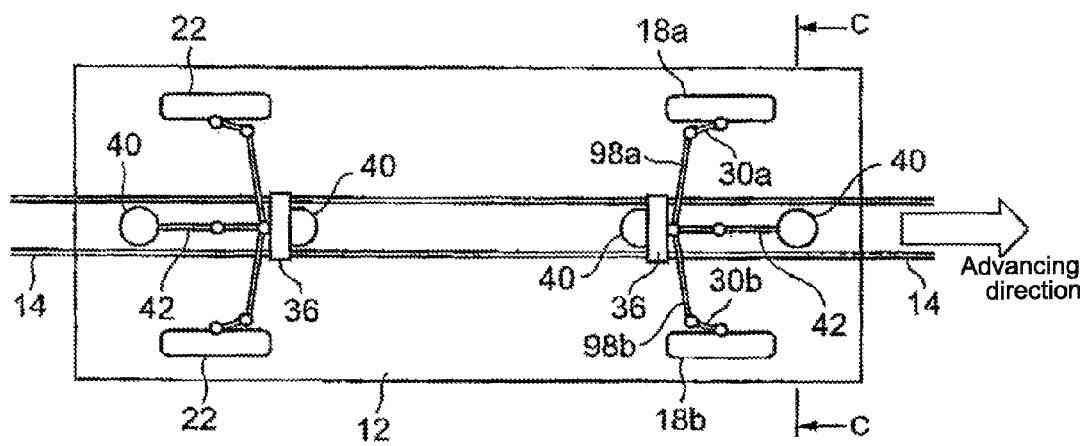
FIG. 11 is an explanatory plan view illustrating a track transportation system in a third embodiment of the present invention.
Figure 12:
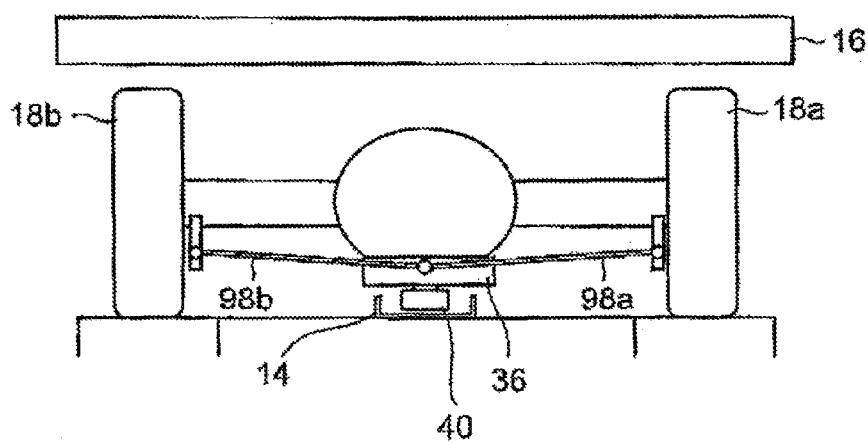
FIG. 12 is a sectional view along line C-C in FIG. 11.
Figure 13:
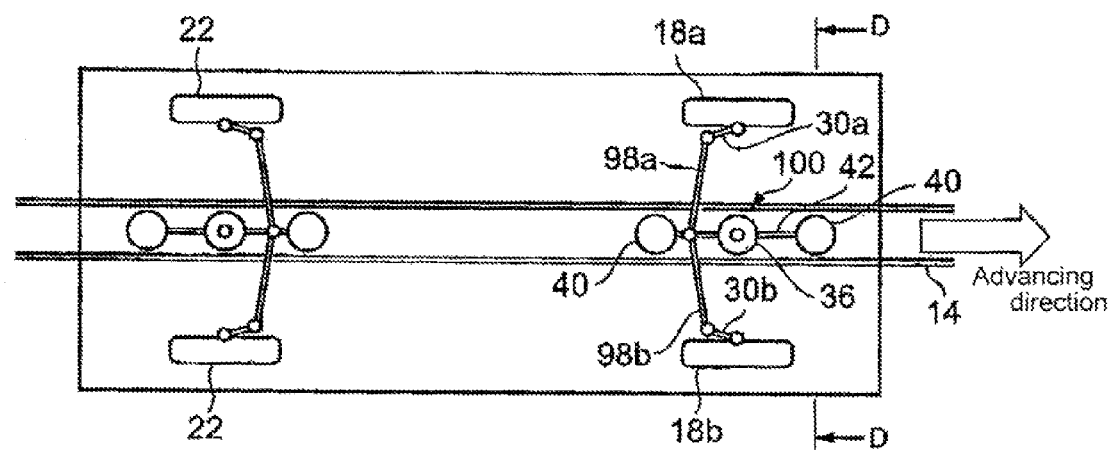
FIG. 13 is an explanatory plane view illustrating a track transportation system in a fourth embodiment of the present invention.
Figure 14:
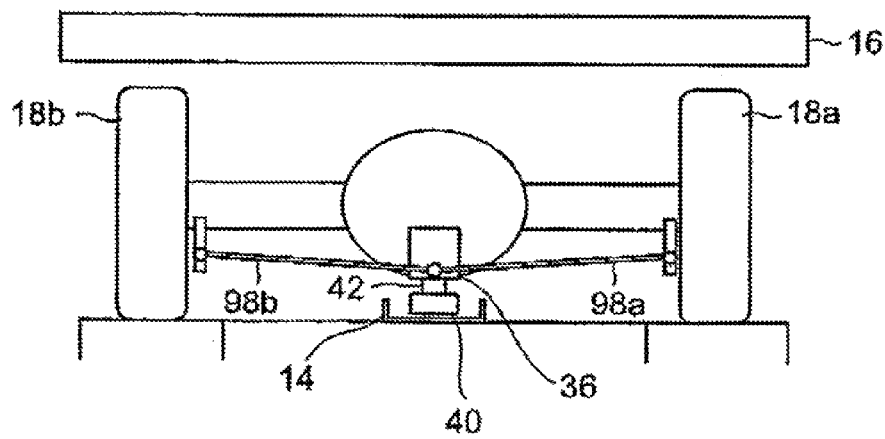
FIG. 14 is a sectional view along line D-D in FIG. 13.
Figure 15A:
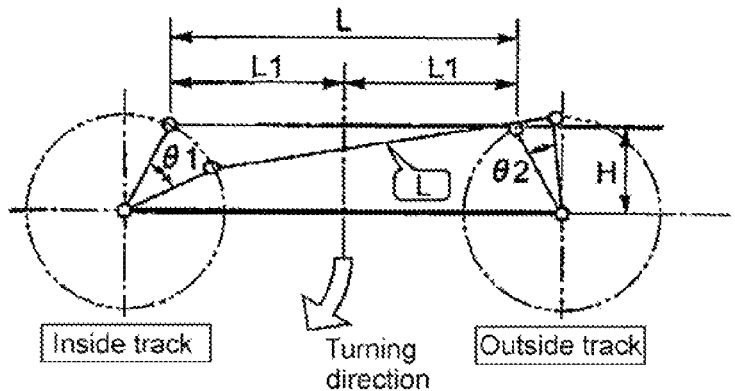
FIG. 15A is a view for explaining the motion of an Ackermann link mechanism.
Figure 15B:
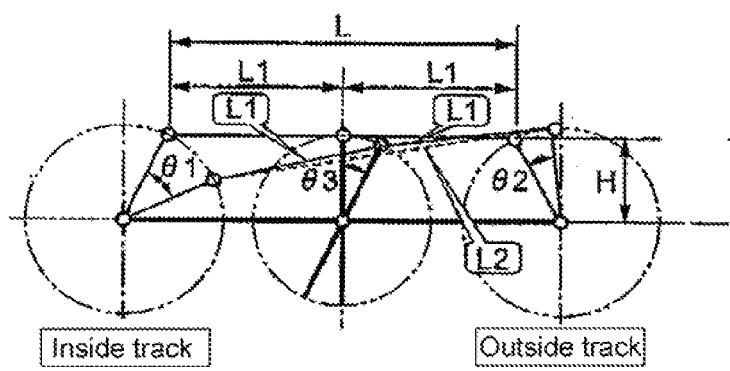
FIGS. 15B to 15C are views for explaining different motions of the steering mechanism caused by protection arms having different lengths.
Figure 15C:
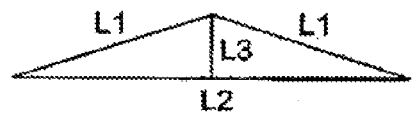
Figure 16:
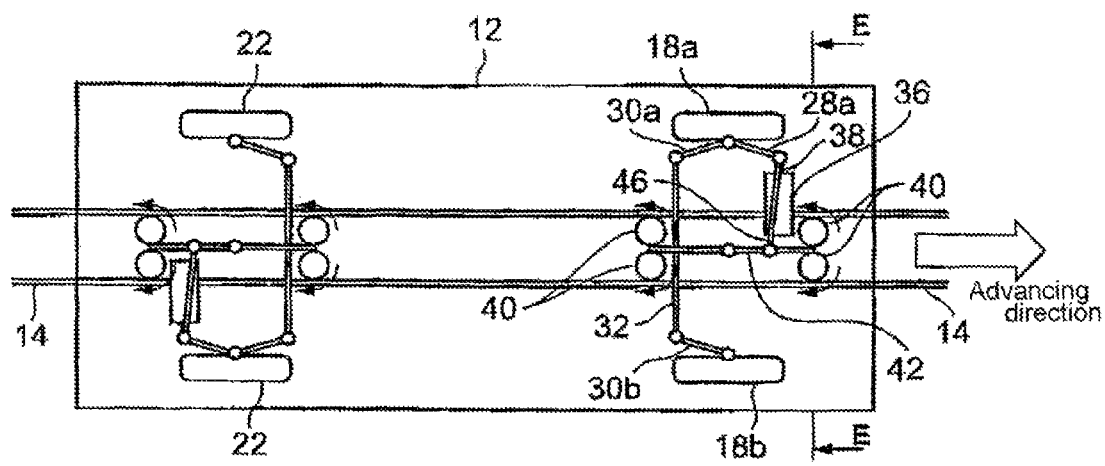
FIG. 16 is an explanatory plan view illustrating a track transportation system in a fifth embodiment of the present invention.
Figure 17:
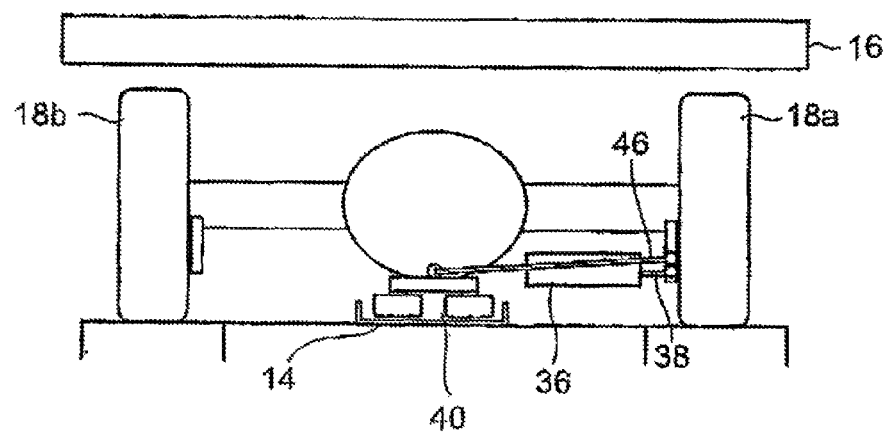
FIG. 17 is a sectional view along a line E-E in FIG. 16.
Figure 18:
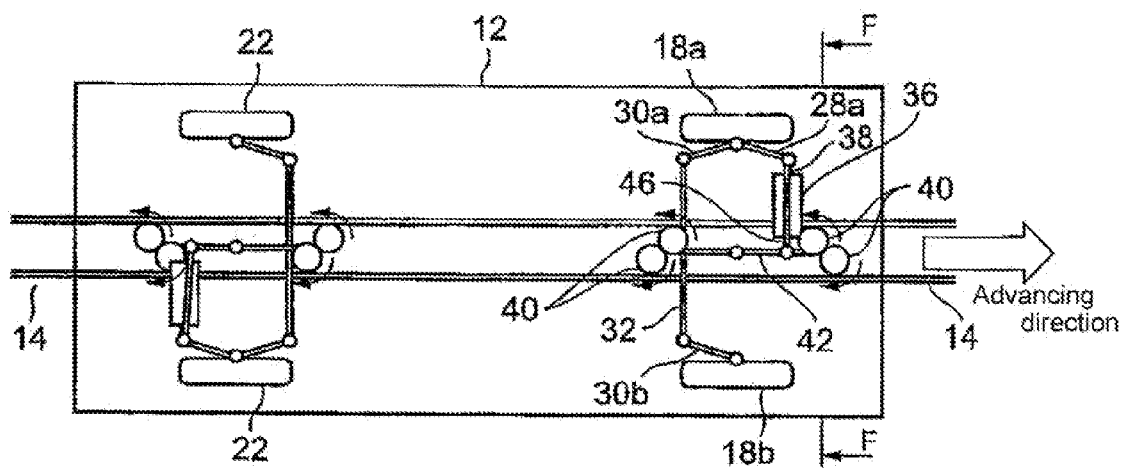
FIG. 18 is an explanatory plan view illustrating a track transportation system in a sixth embodiment of the present invention.
Figure 19:
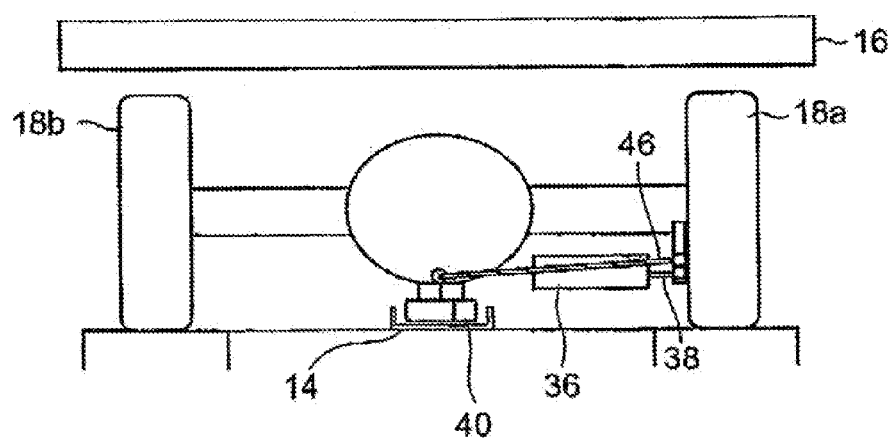
FIG. 19 is a sectional view along line F-F in FIG. 18.
Figure 20:
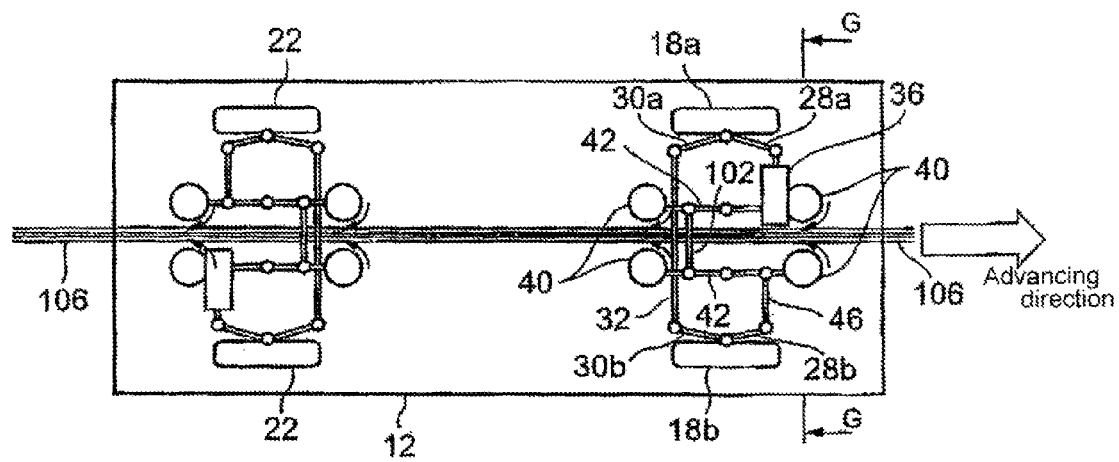
FIG. 20 is an explanatory plan view illustrating a track transportation system in a seventh embodiment of the present invention.
Figure 21:
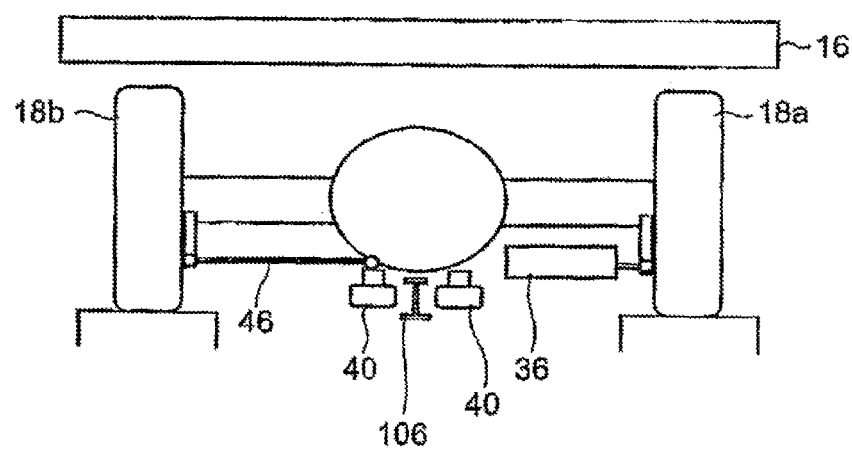
FIG. 21 is a sectional view along line G-G in FIG. 20.
Figure 22:
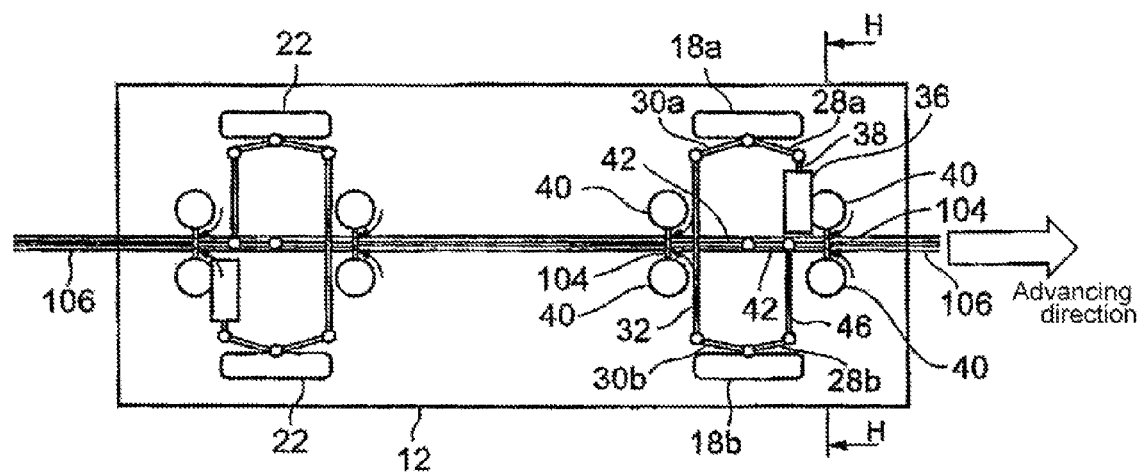
FIG. 22 is an explanatory plan view illustrating a track transportation system in an eighth embodiment of the present invention.
Figure 23:
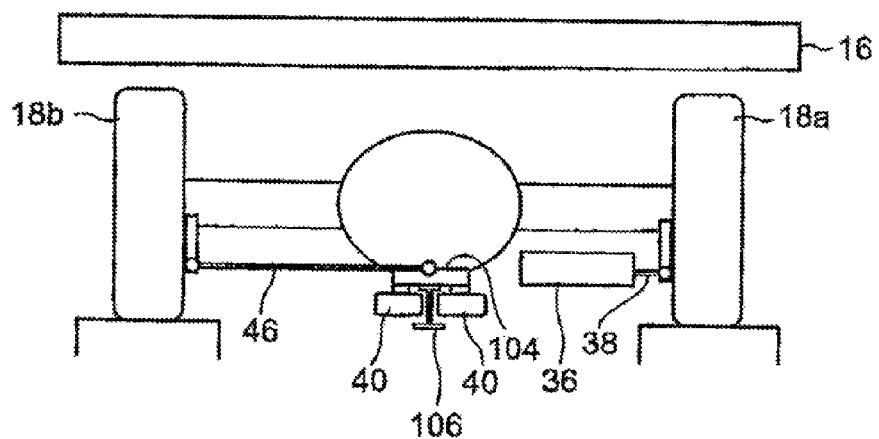
FIG. 23 is a sectional view along line H-H in FIG. 22.
Figure 24A:
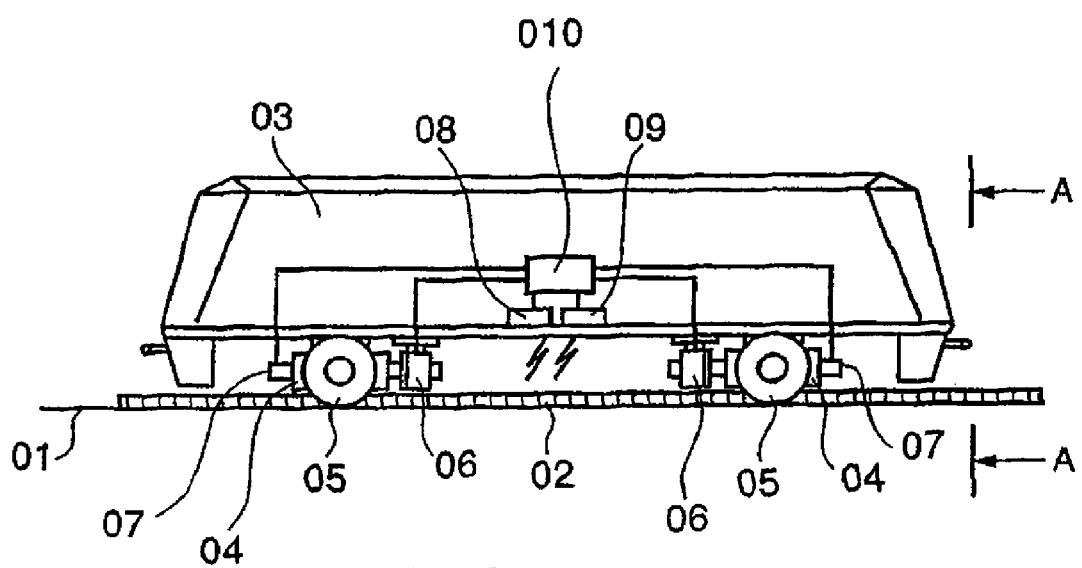
FIG. 24A is a side view illustrating the configuration of a conventional steering system.
Figure 24B:
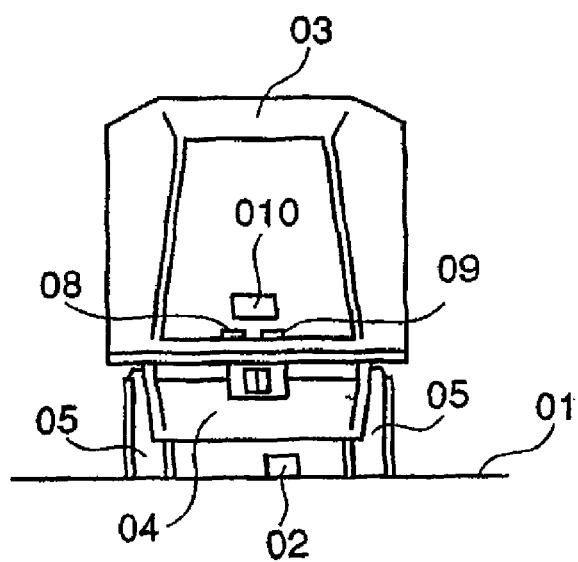
FIG. 24B is a front view illustrating the conventional steering unit shown in FIG. 24A.
Figure 25:
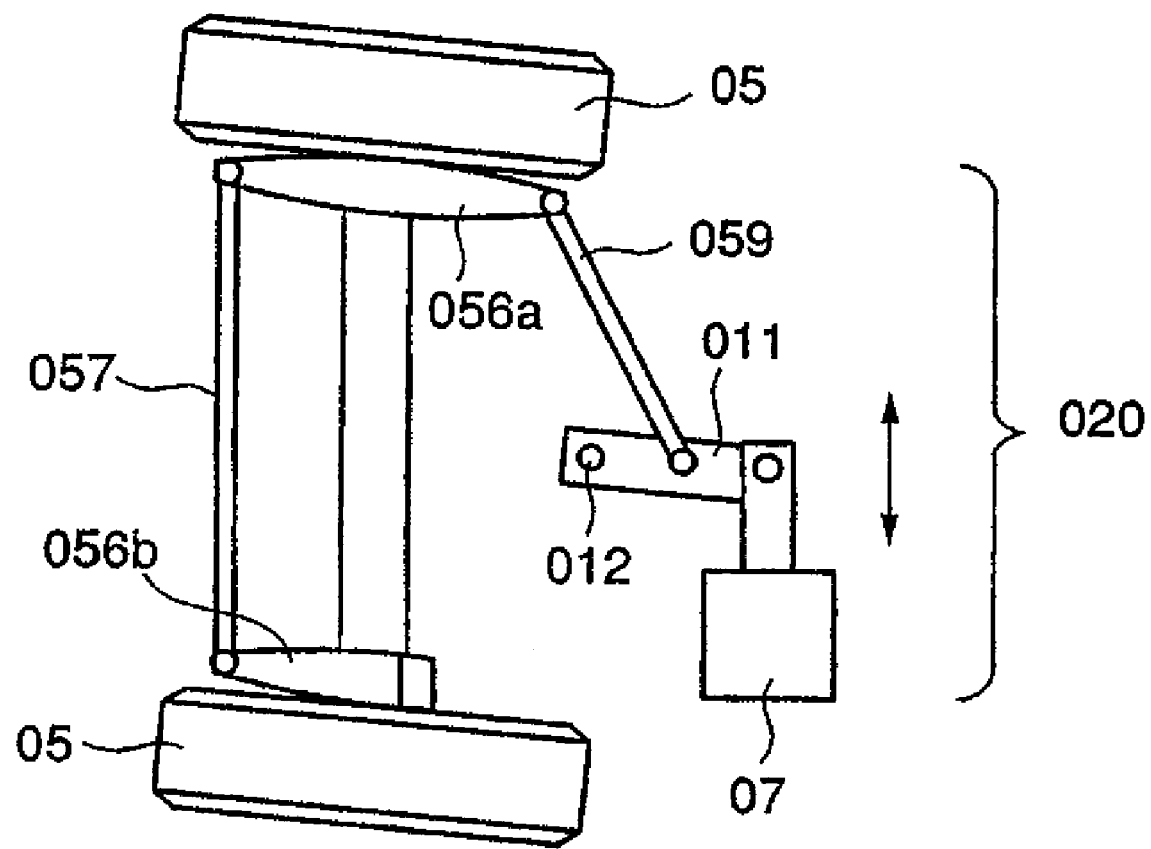
FIG. 25 is a plan view illustrating a conventional steering unit.

As to the accompanying drawings to be referred to, FIG. 1 is an explanatory plan view illustrating a tack transportation system in a first embodiment of the present invention, FIG. 2A is a sectional view along line A-A in FIG. 1, FIG. 2B is an explanatory view illustrating a variant form of the track transportation system shown in FIG. 2A, FIG. 3A is a plan view illustrating a configuration of a vehicle attached thereto with a protection wheel, FIG. 3B is a front view illustrating the configuration shown in FIG. 3A, FIG. 3C is a side view illustrating the configuration, FIG. 4A is a plan view illustrating the configuration attached thereto with an actuator, FIG. 4B is a front view illustrating the configuration shown in FIG. 4A, FIG. 40 is a side view illustrating the vehicle shown in FIG. 4A; FIG. 5 is an enlarged view illustrating a part B in FIG. 2A, FIG. 6 is a block diagram illustrating a control system in the first embodiment of the present invention. FIG. 7 is a flowchart for explaining a control procedure in the first embodiment of the present invention, FIG. 8 is a flowchart for explaining a control procedure carried out by a vehicle position correcting means, FIG. 9 is an explanatory plan view illustrating a track transportation system in a second embodiment of the present invention, FIG. 10 is a sectional view along line B-B in FIG. 9, FIG. 11 is an explanatory plan view illustrating a track transportation system in a third embodiment of the present invention, FIG. 12 is a sectional view along line C-C in FIG. 11, FIG. 13 is an explanatory plane view illustrating a track transportation system in a fourth embodiment of the present invention, FIG. 14 is a sectional view along line D-D in FIG. 13, FIG. 15 is views for explaining the motion of a steering mechanism in the third and fourth embodiments of the present invention, in which FIG. 15A is a view for explaining the motion of an Ackermann link mechanism, and FIGS. 15B to 15C are views for explaining different motions of the steering mechanism caused by protection arms having different lengths, FIG. 16 is an explanatory plan view illustrating a track transportation system in a fifth embodiment of the present invention, FIG. 17 is a sectional view along a line E-E in FIG. 16, FIG. 18 is an explanatory plan view illustrating a track transportation system in a sixth embodiment of the present invention; FIG. 19 is a sectional view along line F-F in FIG. 18, FIG. 20 is an explanatory plan view illustrating a track transportation system in a seventh embodiment of the present invention, FIG. 21 is a sectional view along line G-G in FIG. 20, FIG. 22 is an explanatory plan view illustrating a track transportation system in an eighth embodiment of the present invention, and FIG. 23 is a sectional view along line H-H in FIG. 22. It is noted the like reference numerals are used to denote like parts to those explained in the conventional system (FIGS. 24 and 25) so as to abbreviate duplication of explanation thereof.

Embodiment 1

FIGS. 1 to 8 show a first embodiment of the present invention. As shown in FIGS. 1 and 2, a track transportation system 10 incorporates a vehicle 12 which runs on a track 01. The track 01 is provided in its substantially widthwise center section with a U-like sectional shape protection guide rail 14 which is channel-like with respect to a road surface 15. That is, a U-like steel bar is laid so as to form the U-like protection guide rail 14.

The vehicle 12 is provided thereunderneath with a front wheel bogie 16 for supporting the vehicle 12 and a rear wheel bogie (which is not shown), respectively in the front and rear portion thereof. The front wheel bogie 16 is mounted thereto with an axle for front wheels 18, which is turnable left and right. The front wheels 18 are worn thereon with core type rubber tires 20 which are not shown. Further, the rear wheel bogie is also mounted thereto with an axle for rear wheels 22, which is turnable left and light. The rear wheels 22 are also (similar to the front wheel 18) worn thereon with core type rubber tires 24.

Next, explanation will be made of a steering mechanism 26 for the front wheels 18. It is noted that the steering mechanism for the rear wheels 22 has a configuration similar to that for the front wheels 18.

Referring to FIGS. 1 and 2, there are provided a front steering arm 28a connected to a front left wheel 18a and extended forward, and a rear steering arm 30a extended rearward. Further, a front right wheel 18b is provided thereto with a rear steering arm 30b extended rearward. A tie rod 32 is laid between rear end parts of the rear steering arms 30a, 30b, spanning therebetween. The steering arms 30a, 30b and the tie rod 32 are pivotally coupled to each other by means of spherical joints 34.

Further, the front steering arm 28a is pivotally coupled at its front end part with an end part of a moving rod 38 of an actuator 36 by means of a spherical joint 34. This actuator 36 is mounted to the front wheel bogie 16. The actuator 36 has a motor and a ball and screw mechanism as a specific structure which will be described later. However, the actuator may have any structure such as a pneumatic or a hydraulic servo cylinder structure, a linear motor structure or the like which car: carry out translational motion.

It is noted that the tie rod 32 and the rear steering arms 30a, 30b constitute the so-called Ackermann Jeantaud type link mechanism in order to appropriately control the turn angle of the left and rear wheels upon turning of the vehicle. Further, the front left and rear wheels 18a, 18b are linked to each other by means of the tie rod 32 in order to surely steer the left and right wheels.

Next, the protection guide wheels 40 will be explained. The protection guide wheels 40 have a cylindrical shape, and are rotatably supported to the lower surface sides of the front and rear end parts of the protection arm 42. Further, the protection guide wheels 40 are received in the U-like protection guide rail 14 so that their peripheral surfaces are opposed to side walls of the protection track 14. The protection guide wheels 40 are desirably made of a material such as urethane rubber having a vibration-poof ability and a wear-resistance ability, which are higher, or a material using steel belts as used as rubber tires.

Further, small gaps are present between the protection guide wheel 40 and the side walls of the protection guide rail 14, which are smaller than the allowable range with which the vehicle 12 can not any more be deflected from the track 01, and accordingly, as far as the steering system 26 is normally operated, the protection guide wheel 40 does never make contact with the side walls of the protection guide rail 14. Normally, the gaps between the protection guide wheel 40 and the protection guide rail 14 are set to be in a range from about 80 to 100 mm.

The protection arm 42 has a shape extending in the longitudinal direction of the vehicle, and is supported at its center part to the lower part of the axle 44 for the front wheels 18.

It is noted that the protection guide wheel 40 may be arranged above the road surface 15 as shown in FIG. 2A, or may be arranged below the load surface 15 as shown in FIG. 2B. Thus, as to a specification for replacement, either one of these structures can be selected, being adapted for an existing running track, that is, more flexible measures can be taken up.

The protection arm 42 is coupled, at a position near to its one end part, to the front end part of the front steering arm 28a through the intermediary of a link rod 46, and accordingly, by means of the link rod 46 and the protection arm 42, the protection guide wheels 40 can be turned into a direction identical with the steering direction of the front wheels 18.

The steering mechanism 26 is composed of the actuator 36 and a steering link 27 which is in turn composed of the movable rod 38, the front steering arm 28a, and the rear steering arms 30a, 30b. Further, a linkage mechanism 48 is composed of the protection arm 42 and the link rod 46.

Further, a twin spherical surface joint 50 is provided in the front end part of the front steering farm 28a, as shown in FIG. 5. With the use of the twin spherical surface joint 50, an end part of the movable rod 38 of the actuator 36 and one end part of the link rod 46 can be coupled to the front end part of the front steering arm 28a, being superposed one upon another. The upper spherical joint part 52 thereof is connected thereto with the end part of the movable rod 38 of the actuator 36, and the lower spherical surface joint part 54 is connected thereto with the link rod 46. With the use oE the twin spherical surface joint 50, it is possible to effectively using a space.

That is, the link rod 46 and the actuator 36 are arranged on the left side of the vehicle 12, and accordingly, an effective space can be ensured in the right side section of the vehicle 12. For example, a control unit or the like for the actuator 36 may be arranged in this space.

Further, by arranging the link rod 46 and the actuator 36 on one side of the vehicle 12, the vehicle can accept any countermeasure even though the distance between the left and right wheels is short, the size of the actuator 36 is large or the center positions of the vehicle 12 and the protection guide wheel 14 are shifted left and right from each other.

Explanation will be hereinbelow made of the attachment of the steering mechanism 26, the protection arm 42 and actuator 36 onto the front wheel bogie 16, with reference to FIGS. 3 and 4.

There is provided an axle housing 60 including a differential mechanical portion 56 for receiving a drive force from a drive motor (not shown) and an axle portion 58 for transmitting a drive force to the left and right wheels, which are integrally incorporated with each other. Further, a bogie frame 62 is provided above the axle housing 60.

The protection arm 42 is located at its rotating center to the center of the axle, and is attached thereto with a support bracket 64 supported to the lower part of the differential mechanism portion 56. This support bracket 64 is attached in its upper part to the bogie frame 62, being turned around the differential mechanism portion 56 and extended underneath the latter, and has a protection frame portion 66 for rotatably holding the protection arm 42 in its lower part. Further, the protection frame portion 66 has a double-side support structure in which a rotatable support shaft for the protection arm 42 is held, between both upper and lower side part thereof. Further, the protection frame portion 66 is formed with left and right longitudinal walls 68, 68, with which the turning range of the protection arm 42 is limited.

Figure 4C:
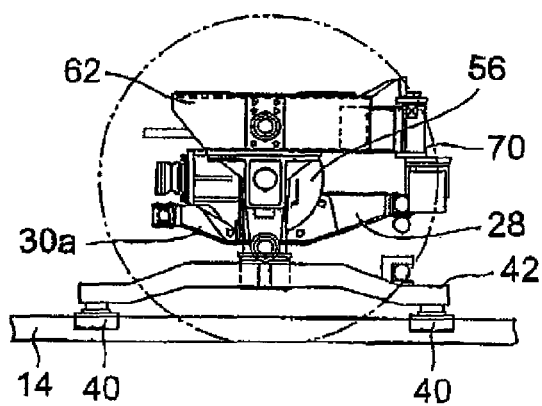
FIG. 4C is a side view illustrating the vehicle shown in FIG. 4A.

As shown in FIG. 4, the actuator 36 has an electrical power motor 72, a clutch 74, a ball screw 76, and a limit guide 78 which are assembled in an L-like sectional shape frame 70 so as to have a unit structure. Thus the frame 70 in which the above-mentioned components are incorporated so as to have the unit structure is attached to the bogie frame 62 by means of bolts. The ball screw 76 has a feed nut part 80 which is connected thereto with one end part of the movable rod 38 of the actuator 36, and the other end part of the movable rod 38 is coupled to the upper spherical surface part 52 of the twin spherical surface joint 50 so as to be connected to the front steering arm 28a.

Further, as shown in FIG. 3, one end part of the protection arm 42 and the lower spherical surface joint part 54 of the twin spherical surface joint 50 are connected therebetween by the link rod 46 so as to be coupled to the front steering arm 28a. The rear steering arm 30a is connected thereto at its rear end part with the tie rod 32 so as to be coupled with the rear steering arm 30b for the right wheel.

In view of the structure of the transportation system in the first embodiment as stated above, since the support bracket 64 attached to the bogie frame 62 is used in order to support the protection arm 42 carrying the protection guide wheel 40, to the lower part of the differential mechanism portion 56 in the axle housing 60 having a high degree of rigidity, there can be eliminated the necessity of modification of the bogie for the attachment of the protection arm 42, thereby it is possible to use the existing bogie frame 62 for the front wheels. Thus, it is possible to aim at commonly using the components of the bogie frame 62 and reducing the manufacturing costs. Further, since the actuator 36 has a anit structure which is attached to the bogie frame 62, the assembly procedure, the replacement procedure for components and the maintenance procedure can be efficiently made, and further, the configuration thereof can be simplified due to the unit structure, thereby it is possible to aim at reducing the weight of the system.

Further, in the first embodiment as stated above, the actuator 36 is normally operated in response to a steering instruction from a control means 82, and accordingly, a steering force is transmitted to the front left wheel 18a from the actuator 36, and is then transmitted to the front right wheel 18b from the front steering arm 28a through the intermediary of the rear steering arm 30a and then the tie rod 32. Moreover, the steering force from the actuator 36 is transmitted from the twin spherical surface joint 50 to the protection arm 42 through the intermediary of the link rod 46, and accordingly, the protection guide wheels 40 are also turned in association with the operation of the actuator 36 in the same direction as that of the front wheels 18. Thus, the protection wheels 40 travels in the protection guide rail 14 together with the vehicle 12 on running without making contact with the side walls of the protection guide rail 14.

Next explanation will be made of the operation control for the vehicle in the first embodiment with reference to FIGS. 6 to 8.

As shown in FIG. 6 which is a control system block diagram, the control means 82 receives an on-ground position signal, vehicle position data, a contact detection signal.

The on-ground position signal (on-ground position data) is the signal transmitted from a ground element 02 as explained in the conventional example, that is, a signal transmitted from one of the ground elements 02 with non-electric source, which are laid at predetermined intervals along the track 01 over the entire length of the track 01. The transmitted data includes an identification number of the ground element 02, position data, track data and control data. The position data includes absolute position coordinates and a distance from the reference point with respect to the ground element 02. Further, transponders similar to the ground elements may be used, instead of the ground elements.

The vehicle position data indicates a position where the vehicle is located, that is, the vehicle position data indicates a vehicle position which is calculated by complementing a distance between the ground elements 02 with GPS (Gloval Positioning System) data, pulse signals indicating a rotational speed of a tire, pulse signals indicating a rotational speed of the drive motor or the like. Further, the vehicle position data may be obtained from a radio signal transmitted from a supervisory control center, a command center or the like.

The contact detection signal indicates the detection that the protection guide wheel 40 makes contact with the protection guide rail 14, by means of a limit sensor attached to the protection arm 42, a pulse sensor detecting the rotation of the guide wheel 40, a steering torque sensor provided in the steering mechanism 26 or the like.

The control means 82 is mainly composed of, as shown in FIG. 7, a track data determining means 84, a normal running means 86 which is energized in the case that the track data determining means 84 determines a normal straight or curved portion, a fail-safe means 88 in the case of a failure of the steering mechanism 26 or the like during running of the vehicle by the normal running means 86, and a vehicle position correcting means 90 in the case that the track data determining means 84 determines a stop station or a turnout portion.

It is noted that the control means 82 may be set either within the vehicle or any one of the supervisory center, the command center and the like outside the vehicle so as to build up a control system for batch command control.

The control procedure will be explained with reference a flowchart shown in FIG. 7. At first, the track data determining means 84 determines track data in accordance with the on-ground position signal (on-ground position data), the vehicle position data and the like (S1). The track data determining means 84 determines a position where the vehicle is located, and a portion of the track where the vehicle runs, such as a straight portion, a curved portion, a stop station or a turnout portion. Further, it can determine a distance (how many meters) to a next presence such as a stop station, a turnout portion or a sharply curved portion.

When the track data determining means 84 determines a normal straight or curved portion, the control by the normal running means 86 is carried out.

The normal running means 86 detects a position where the vehicle runs from the vehicle position data, and then compares the vehicle position with running data previously stored in the storage part of the control means 82 so as to determine a steering pattern (S3). Further, automatic steering is turned on (S5) so as to transmit an automatic steering instruction in view of the steering pattern, to the actuator 36 in order to initiate the automatic steering (S7). Thereafter, the front wheels 18 are turned by means of the actuator 36 so as to guide the vehicle.

During running under the automatic steering, whether the protection guide wheel 40 makes contact with the protection guide rail 14 or not is determined in view of the contact detection signal (S9). That is, the protection guide wheel 40 would make contact with the protection guide rail 14 so as to deliver a contact detection signal if, for example, the vehicle 12 tends to go off from the track 01 in the case that the steering mechanism 26 fails. If it is true, it is determined that the steering mechanism 26 fails, and accordingly, the control is carried out by the fail-safe means 88. But, if it is false, it is determined that the steering mechanism 26 is normally operated, and accordingly, the automatic steering instruction with the steering pattern is held (S10) so as to continue the automatic steering.

As to the control by the fail-safe means 88, at first, the automatic steering is turned off (S11) so as to release the steering carried by the actuator 36 in order to set the steering mechanism 26 to be free. Thereafter, the protection guide wheels 40 make contact with the protection guide rail 14 so as to turn the front wheels 18 through the motion of the protection arm 42 along the side walls of the protection guide rail 14 in order to steer the vehicle 12. That is, the mechanical feedback caused by the protection guide wheels 40 and the protection guide rail 14 guides the vehicle 12 (S13). Further, the steering instruction value is reset (S15).

Thus, due to the provision of the fail-safe means 88, even though a failure or the like of the steering mechanism 26 in the vehicle occurs, the vehicle can be safely protected, and passengers can be surely transported, thereby it is possible ensure the safety and the reliability.

In the case of determination of a stop station, a turnout portion or a position just before the stop station or the turnout portion by the track date determining means 84, the control is made by the vehicle position correcting means 90.

As to the control by the vehicle position correcting means 90, the automatic steering is turned off (S17), and as shown in FIG. 8, when the vehicle 12 comes into a vehicle position correcting zone 94 incorporating position adjusting members 92 at the opposite side surfaces of the protection guide rail 14, the vehicle 12 is forced to be set on a running path defined by the vehicle position correcting members 92, by means of the protection guide wheels 40. That is, an initial value is set in the steering system through mechanical constraint feed-back, and accordingly, the vehicle 12 is set to a predetermined position on the road surface of the track (S19). Then, a steering instruction value for the automatic steering is reset (S21). Thereafter, when it is determined that the vehicle 12 passes by the vehicle position correcting zone 94 (S23) from ground position signals from the ground elements 02, a new steering pattern is determined in accordance with the vehicle position data (S25). Further, the automatic steering is turned on (S27), and accordingly, an automatic steering instruction based upon the new steering pattern is transmitted to the actuator 36 so as to initiate the automatic steering (S29).

The width between both side walls of the protection guide rail 14 in the vehicle position correcting zone 94 in the vehicle position correcting mean 90 is set to the value that the protection guide wheels 40 make contact with the both side walls of the protection guide rail 14. Specifically, the width is set to a value which is slightly larger than that of the protection guide wheels 40 by 1 to 5 mm. Further, the longitudinal length of the protection guide rail 14 in the vehicle position correcting zone 94 is set to a value which is at least not less than the overall length of the vehicle, which is preferably 1 to 3 times as long as the overall length of the vehicle.

Thus, when the vehicle 12 passes through the vehicle position correcting zone 94, the protection guide wheels 40 make contact with the position adjusting members 92 laid along both side walls of the protection guide rail 14, and accordingly, the vehicle position is corrected so as to cause the vehicle to go along the rung path defined by the protection guide rail 14. Thus, even though the vehicle 12 is positionally deviated left and light due to various disturbances, or even though the vehicle causes occurrence of a yaw angle (the inclination of the longitudinal axis of the vehicle with respect to the running direction of the vehicle) or the like, the vehicle position is corrected to an original position or a desired set position by the vehicle position correcting means 90.

The vehicle position correcting zone 94 is desirably arranged at a position which is just before a point from which the vehicle enters into a stop station in order to obtain an appropriate space with respect to a platform in the stop station, or which is just before a turnout portion, a curved track or the like.

As stated above, in the first embodiment of the present invention, the tack data determining means 84 determines a straight portion, a curved portion, a stop station, a turnout portion or the like from the track data so as to carry out the operation by the normal running means 84, the operation by the vehicle position correcting means 90 or the operation by the fail-safe means 88, thereby it is possible to enhance the safety and the reliability of the transportation system during running of the vehicle under automatic steering, and to enable the vehicle to run with a high degree of efficiency and at a high speed.

Further, the protection guide wheels 40 can make contact with the protection guide rail 14 so as to steer the vehicle 12 by means of the protection guide wheel 40, that is, the vehicle 12 is guided by the protection guide wheels 40 and the protection guide rail 14, and accordingly, the vehicle 12 can be safely protected so as to surely transport the passengers even though the steering mechanism 26 of the vehicle fails and so forth, thereby it is possible to ensure the safety and the reliability of the transportation system.

Further, the steering mechanism is constituted by the tie rod 32, and the front and rear steering arms 28, 30 so as to transmit a drive force to one of the front wheels 18 from the actuator 36, and accordingly, the front left and right wheels can be surely steered.

Further, the protection arm 42 mounted thereto with the protection guide wheels 40 is supported to the lower part of the differential mechanism portion 26 of the highly rigid axle housing 60 so as to have a unit structure, and as well, the actuator 36 has a unit structure which is mounted to the bogie frame 62. Thus, the efficiencies of working, replacement of components, and maintenance for the vehicle can be enhanced, further the configuration of the vehicle can be simplified due to the unit structures, thereby it is possible to aim at reducing the weight of the vehicle.

Embodiment 2

Next, a second embodiment of the present invention will be explained with reference to FIGS. 9 to 10. The second embodiment will concern a variant form of the steering mechanism 25 explained in the first embodiment. Like reference numerals will be used to denote parts like to those explained in the first embodiment so as to abbreviate the explanation thereto.

Referring to FIG. 9 which is a plane view, the basic configuration of the steering mechanism 26 is identical to that explained in the first embodiment, except that the link rod 46 is located on the side remote from the place where the actuator 36 is arranged.

Although both left and right spaces are occupied, this arrangement is effective in the case that both link rod 46 and actuator 36 cannot be arranged one upon another on one side due to the actuator 36 having a large size. Further, since the necessity of a coriuonent such as the twin spherical surface joint 50 used in the first embodiment can be eliminated, the costs of the steering mechanism 26 can be reduced.

Embodiment 3

Next, explanation will be made of a third embodiment of the present invention with reference to FIGS. 11 and 12. The third embodiment will concern a variant form of the steering mechanism 26.

Referring to FIGS. 11 and 12, the rear end part of the protection arm 42 and the rear end parts of the rear steering arms 30a, 30b for the left and right wheels are connected to one another by means of left and right side tie rods 98a, 98b, and the respective connection parts are constituted by spherical joints 34. Further, the actuator 36 is coupled to the rear end part of the protection arm 42 which is therefore turned directly thereby. It is noted that a linear motor or the like may be used as the actuator 36.

In this embodiment, since the protection arm 42 is directly operated by the actuator 36, backlash caused by abrasion of a rod end or a rotary part or bending of a rod can be prevented, thereby it is possible to reduce control delay or control error, resulting in accurate control, in comparison with the first and second embodiments in which a torque is transmitted to the protection arm 42 through the intermediary of the link rod 46.

Further, the necessity of the link rod 46 can be eliminated, it is advantageous in view of the maintainability, and the gross weight can be reduced.

As shown in FIG. 15, it is required that the position of the coupling point between the protection arm 42 and the side tie rods 98a, 98b satisfies a predetermined condition in order to constitute a Ackermann Jeantaud link mechanism with the use of the left and right side tie rods 98a, 98b, and the left and right rear steering arms 30a, 30b.

FIG. 15A which is a view for explaining a standard motion of an Ackermann link mechanism, that is, a plan view as viewed from thereabove, shows the motion of the linkage in the case of turning downward in the direction of the arrow, exhibiting the relationship between the turning angle $\theta_1$ of the wheel on the inside of the track and the turning angle $\theta_2$ of the wheel on the outside of the track in the case of connection of the tie rod having a length L when the vertical length of the left and right steering arms become H.

Figure 15D:
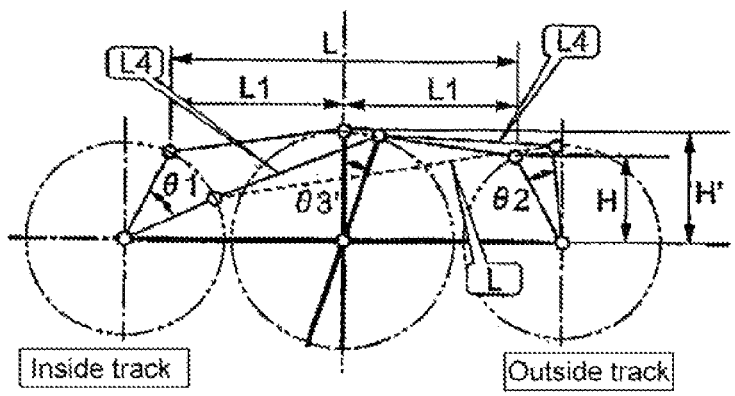
FIG. 15D shows the case of H<H'.

FIGS. 15B and 15D show the relationship in the case of inclusion of the protection arm 42 interposed therebetween.

It is noted here that the distance H is a vertical distance from the center axial line of the front wheels 18, to the coupling points between the protection arm 42 and the steering arms 30a, 30b when the pivoting center of the protection arm 42 is positioned at the midpoint of the above-mentioned center axial line while the distance H' is a vertical distance from the center axial line to the coupling points between the steering arms 30a, 30b and the side tie rods 9a, 98b, and the distance L is between the left and steering arms 30, 30b while L1 is one-half of the distance L.

Referring to FIG. 15B which shows the case of H=H', as shown in FIGS. 15B and 15C, since a virtual die rod length L2 has a relationship exhibited by the following formula (I), the outside track turning angle has a relationship of $\theta_2'<\theta_2$, and accordingly, the turning angle relationship of the Ackermann link mechanism shown in FIG. 15A cannot be obtained:

$$L2=\sqrt{(L12-L32<2xL1}$$

As shown in FIG. 15D which shows the case of H<H', as shown in FIG. 15D, the tie rod length L4 becomes L4>L1, and accordingly, the outside track turning angle is $\theta_2$. Thus, the relationship of the Ackermann link mechanism can be obtained.

As a result, it is required to set the vertical distance H from the center axial line to the coupling points between the protection arm 42 and the side tie rods 98a, 98b so as to be longer than the vertical distance H' from the center axial line to the coupling points between the steering arms 30a, 30b and the side tie rods 98a, 98b.

Thus, it is possible to constitute the steering mechanism having a turning angle of the front left wheel 18a and the front right wheel 18b, which is set to an appropriate value.

Embodiment 4

Next, a fourth embodiment of the present invention will be explained with reference to FIGS. 13 and 14, the forth embodiment will concern another variant form of the steering mechanism 26 explained in the third embodiment.

As shown in FIGS. 13 and 14, the actuator 36 explained in the third embodiment of the present invention is incorporated in a rotary support shaft portion 100 for of the protection arm 42. It is required to use a speed reduction mechanism integrally incorporated in the actuator 32 in order to reduce the speed of a motor or the like in the case that a rotating type actuator such as a motor or the like is used as the actuator.

As in this embodiment, by incorporating such an actuator 36 in the rotating support shaft portion 100 of the actuator 36, the system itself can be assembled in a compact form, thereby it is possible to reduce the weight of the system, and to enhance the accuracy and the maintainability.

Embodiment 5

Next, a fifth embodiment of the present invention will be explained with reference to FIGS. 16 and 17. The fifth embodiment will concern a variant form of the arrangement of the protection guide wheels 40 in the first and second embodiments.

As shown in FIGS. 16 and 17, the protection guide wheels 40 are arranged left and right in parallel at each of the opposite end parts of the protection arm 42. That is, the four protection guide wheels 40 are provided per bogie.

With this configuration, since the side on which the protection guide wheels 40 are made into contact with the side walls of the protection guide rail 14 is fixed, the protection guide wheels 40 are rotated in one and the same direction if the advancing direction is fixed, thereby it is possible to enhance the durability of the protection guide wheels 40. Further, since the durability can be enhanced, it is possible to enhance the serviceability as to replacements of components or the like. It is noted in the case of the first and second embodiments that the protection guide wheels 40 possibly make contact with both sidewalls of the protection guide rail 14 since the protection guide wheels are arranged each for back and forth, and accordingly, they are rotated in different directions. Thus, the relative rotation of the protection guide wheels 40 which is caused when the protection guide wheels 40 make contact with the side walls of the protection guide rail 14 becomes twice, and as a result, the protection guide wheels 40 tends to have a shortened durability.

Embodiment 6

Next, a sixth embodiment of the present invention will be explained with reference to FIGS. 18 and 19. The sixth embodiment will concern a variant form of the arrangement of the protection wheels 40 in the fifth embodiment of the present invention.

Referring to FIGS. 18 and 19, two left and right protection guide wheels 40 are arranged on opposite sides of the protection arm 42 at each of opposite ends thereof, being positionally shifted from each other in the longitudinal direction thereof.

With this arrangement, in the case of the protection guide rail having one and the same width, the diameter of the protection guide wheels 40 can be increased, thereby it is possible to further enhance the durability of the protection guide wheels. On the contrary, in the case of the protection guide wheel 40 having one and the same durability, the protection guide rail 14 can be narrowed while the weight of the protection guide rail 14 becomes less, thereby it is possible to improve the workability of laying the protection guide rail. Further, since the width of the protection guide rail can be narrower, the degree of accuracy of the protection guide rail in a curved portion can be enhanced.

Embodiment 7

Next, explanation will be made of a seventh embodiment of the present invention with reference to FIGS. 20 and 21. The seventh embodiment will concern a variant form of the protection guide rail.

Referring to FIGS. 20 and 21, a protection guide rail 106 has a I-like shape, that is, an I-like shape steel rail is laid on the road surface 15, and left and right protection arms 42, 42 are arranged in parallel with each other on opposite sides of the protection guide rail 106 so as to interpose the I-like steel rail therebetween. The left and right protection arms 42, 42 are configured so as to move in parallel with each other through the intermediary of a protection connecting rod 102.

As to the configuration of the link mechanism, explanation will be made of an example constituted being based upon the second embodiment, as shown in FIGS. 20 and 21. The link rod 46 connects the front end part of the front steering arm 28b for the front right wheel, to the right protection arm 42 in the vicinity of the front end part of the latter.

In this embodiment, since the Laying width of the protection guide rail 106 can become narrower, there can be eliminated the problem of interference with signal lines laid on the track. Further, with the provision of the I-like protection guide rail 106, the structure of the protection guide rail 106 can be simplified. Further, bending the protection guide rail 106 so as to form a curved portion can be facilitated, and accordingly, the protection guide rail 106 can be readily laid. Further, the place where the protection guide rail 106 is laid, can be shifted from the center of the track.

It is noted that there may be of course exhibited similar technical effects and advantages even though the link rod 46 is provided on one and the same side as that of the actuator as in the first embodiment of the present invention.

Embodiment 8

Next, explanation will be made of an eighth embodiment of the present invention with reference to FIGS. 22 and 23. The eight embodiment will concern variant forms of the protection arm 42 and the protection guide wheels 40 explained in the seventh embodiment of the present invention.

Referring to FIGS. 22, 23, the left and right protection guide wheels 40, 40 are arranged on both sides of the I-like protection guide rail 106 which is therefore interposed therebetween, and are linked to each other by protection guide wheel connecting rods 104 which are arranged back and forth and which are connected to each other through the intermediary of the protection arm 42.

As to the configuration of the link mechanism, as shown FIGS. 22 and 23, there will be explained, as an example, a mechanism which is constituted being based upon the second embodiment of the present invention. The link rod 46 connects the front end part of the front steering arm 28b for the front right wheel, to the protection arm 42 in the vicinity of the front end part of the latter.

In this embodiment, since only one protection arm 42 is used, the structure of the protection arm 42 can be simplified in comparison with the configuration in the seventh embodiment in which two protection arms are required, and accordingly, the weight thereof can be reduced. Further, the number of required components, and the number of rotating members can be reduced in comparison with those explained in the seventh embodiment, thereby it is possible to improve the serviceability including replacement of components.

Further, since the protection guide rail 14 has an I-like cross-sectional shape, the upper flange of the protection guide rail 14 serves as a vertical stopper for the protection guide wheels 40, that is, it can serve as a safety stopper for countermeasure against turn-over of the vehicle 12.

It is noted that one and the same technical effects and advantage can be of course obtained even though the link rod 46 is arranged on one and the same side as that of the actuator as explained in the first embodiment of the present invention.

According to the present invention, a safety can be surely ensured with a simple configuration and a light weight, for a track transportation system in which a vehicle runs on a predetermined track, being automatically steered with no use of a mechanical steering composed of guide wheels, a guide rail and the like, and further, efficient operation can be made at a high speed. The present invention can be effectively applied in a track transportation system.

What is claimed is:

1. A track transportation system in which a vehicle runs on a predetermined track, comprising:
  a steering mechanism for automatically steering front and rear wheels of the vehicle by actuators in a steering direction;
  a protection guide rail with respect to a road surface of the track,
  protection guide wheels travelling along the protection guide rail without making contact with the protection guide rail, and provided at least one set in each of front and rear parts of the vehicle underneath the vehicle;
  a link mechanism linked to the steering mechanism so as to turn the protection guide wheels into the steering direction of the front or rear wheels during running of the vehicle; and
  a control unit including
    a track data determining device determining a track data in view of a vehicle position data; and a normal running device delivering an automatic steering instruction to the steering mechanism in response to the track data determined by the track data determining device; and a protection arm extending longitudinally of the vehicle and pivotally supported at a rotating center of the protection arm to the lower part of an axle of the front or rear wheels, wherein the protection arm has both front and rear end parts at which the protection guide wheels are provided, the steering mechanism includes left and right tie rods linking the protection arm respectively to the left and right wheels, and the actuator for turning the protection arm, the rotating center of the protection arm is located at a middle of a center axial line of the left and right wheels, and a vertical distance from the center axial line to a coupling point of the left and right side tie rods coupling the protection arm is greater that a vertical distance from the center axial line to coupling points of the tie rods coupling the wheel side.

2. A track transportation system as set forth in claim 1, wherein the automatic steering mechanism is controlled by the normal running device in accordance with a predetermined steering pattern when the track data determining unit determines the straight portion or the curved portion.

3. A track transportation system as set forth in claim 2, wherein the control unit further includes a fail-safe device for turning off the automatic steering instruction to the steering mechanism, and the control unit is configured to interrupt the control for the automatic steering when the steering mechanism is abnormal during the control for the automatic steering by the fail-safe device, and steer the vehicle with the protection guide wheels in such a way that the protection guide wheels make contact with the protection guide rail.

4. A track transportation system as set forth in claim 1, further comprising a vehicle position correcting device which is configured to interrupt the steering by the steering mechanism when the track data determining device determines the track data, and to force the protection guide wheels to be positioned on a travel path defined by the protection guide rail so as to correct the position of the vehicle.

5. A track transportation system as set forth in claim 1, wherein the actuator is incorporated in a rotary support bearing portion of the protection arm.

6. A track transportation system as set forth in claim 1, wherein the protection guide rail is a U-shape steel bar, the protection guide wheels are arranged in the U-shape steel bars without making contact with side walls of the protection guide rail, and the protection wheels are arranged respectively at both front and rear ends parts of the protection arm, two for each end part, on the left and right sides of the protection arm, as viewed in a plane view.

7. A track transportation system as set forth in claim 1, wherein the protection guide wheels include a pair of guide wheels that are respectively attached to both front and rear end parts of the protection arm, and movable along the protection guide rail without making contact with the protection guide rail, and the protection guide rail is arranged on the road surface.

\* \* \* \* \*